United States Patent
Furukawa

(10) Patent No.: US 10,608,568 B2
(45) Date of Patent: Mar. 31, 2020

(54) CONTROL DEVICE FOR AC ROTARY MACHINE

(71) Applicant: Mitsubishi Electric Corporation, Tokyo (JP)

(72) Inventor: Akira Furukawa, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 15/541,601

(22) PCT Filed: Jan. 23, 2015

(86) PCT No.: PCT/JP2015/051841
§ 371 (c)(1),
(2) Date: Jul. 5, 2017

(87) PCT Pub. No.: WO2016/117115
PCT Pub. Date: Jul. 28, 2016

(65) Prior Publication Data
US 2018/0006590 A1   Jan. 4, 2018

(51) Int. Cl.
*H02P 6/10* (2006.01)
*H02P 21/22* (2016.01)
(Continued)

(52) U.S. Cl.
CPC ............ *H02P 21/22* (2016.02); *B62D 5/0463* (2013.01); *G01D 5/24476* (2013.01); *H02P 6/16* (2013.01);
(Continued)

(58) Field of Classification Search
CPC .............. B62D 15/0235; B62D 5/0463; B62D 5/0481; G01D 5/145; H02P 21/14; H02P 25/03; H02P 27/08; H02P 6/16
See application file for complete search history.

(56) References Cited

U.S. PATENT DOCUMENTS

| 5,925,953 A | 7/1999 | Shibata |
| 2002/0011814 A1 | 1/2002 | Nakajima |

(Continued)

FOREIGN PATENT DOCUMENTS

| JP | 6-13379 U | 2/1994 |
| JP | 2002-034278 A | 1/2002 |

(Continued)

OTHER PUBLICATIONS

International Search Report for PCT/JP2015/051841, dated Mar. 10, 2015 (PCT/ISA/210).

(Continued)

*Primary Examiner* — Muhammad S Islam
(74) *Attorney, Agent, or Firm* — Sughrue Mion, PLLC; Richard C. Turner

(57) ABSTRACT

In a control device for an AC rotary machine, having an angle detector for detecting an electrical angle of the AC rotary machine, a detection error produced by the angle detector due to a noise magnetic field generated by a multi-phase alternating current flowing through an inverter connection unit is corrected using a correction signal having a phase and an amplitude that are determined in accordance with a relative positional relationship between the inverter connection unit and the angle detector and a current vector of the multi-phase alternating current, whereupon an inverter is controlled on the basis of the corrected electrical angle. As a result, a simple, low-cost control device for an AC rotary machine with which an angular position of a rotor can be detected with a high degree of precision is obtained.

20 Claims, 20 Drawing Sheets

(51) Int. Cl.
  *H02P 6/16* (2016.01)
  *G01D 5/244* (2006.01)
  *H02P 25/03* (2016.01)
  *B62D 5/04* (2006.01)
  *H02P 21/14* (2016.01)
  *H02P 27/08* (2006.01)
  *G01D 5/14* (2006.01)
  *B62D 15/02* (2006.01)

(52) U.S. Cl.
  CPC .............. *H02P 21/14* (2013.01); *H02P 25/03* (2016.02); *H02P 27/08* (2013.01); *B62D 5/0481* (2013.01); *B62D 15/0235* (2013.01); *G01D 5/145* (2013.01)

(56) References Cited

U.S. PATENT DOCUMENTS

| 2003/0222612 A1* | 12/2003 | Matsushita | B62D 5/0487 |
| --- | --- | --- | --- |
| | | | 318/437 |
| 2004/0257027 A1* | 12/2004 | Matsuo | H02P 21/26 |
| | | | 318/722 |
| 2005/0248306 A1* | 11/2005 | Chen | H02P 6/16 |
| | | | 318/712 |
| 2007/0132423 A1* | 6/2007 | Ajima | H02P 6/10 |
| | | | 318/719 |
| 2008/0297078 A1* | 12/2008 | Iwasaki | H02P 21/22 |
| | | | 318/400.02 |
| 2011/0304293 A1 | 12/2011 | Nishitani | |

FOREIGN PATENT DOCUMENTS

| JP | 2007-049862 A | 2/2007 |
| --- | --- | --- |
| JP | 2008-219995 A | 9/2008 |
| JP | 2009-156852 A | 7/2009 |
| JP | 2010-148248 A | 7/2010 |
| JP | 2011-259635 A | 12/2011 |
| JP | 2013-007731 A | 1/2013 |

OTHER PUBLICATIONS

Communication dated Sep. 19, 2019 from the Intellectual Property of India in application No. 201747024978.

* cited by examiner

CONTROL DEVICE FOR AC ROTARY MACHINE

CROSS REFERENCE TO RELATED APPLICATIONS

This application is a National Stage of International Application No. PCT/JP2015/051841 filed Jan. 23, 2015, the contents of all of which are incorporated herein by reference in their entirety.

TECHNICAL FIELD

This invention relates to a control device for an AC rotary machine, having a magnetic sensor for detecting an angular position of a rotor.

BACKGROUND ART

In an AC rotary machine used in an electric power steering device or the like, it is necessary to detect an angular position of a rotor of a motor with a high degree of precision in order to reduce a torque ripple in the motor. However, the detection precision of a magnetic sensor that detects the angular position of the rotor decreases due to the effect of a magnetic field generated by the motor itself.

In a conventional AC rotary machine for solving this problem, an improvement is achieved in the precision with which the angular position is detected by disposing a lid unit between an armature of the motor and the magnetic sensor so that the sensor is not affected by a magnetic field generated by the armature (see PTL 1, for example).

In another AC rotary machine, the magnetic sensor is configured to be capable of detecting a magnetic field generated by a sensor magnet with a high degree of precision by providing a magnetic induction unit in contact with a holder that holds the sensor magnet (see PTL 2, for example).

Furthermore, a conventional device serving as a resolver device achieves an improvement in the precision with which an angular position is detected by implementing frequency analysis on a speed signal while referring to an angle signal detected by a resolver in order to calculate a detection error for each frequency component, and correcting the angle signal using an estimated angle error signal obtained by synthesizing the detection errors (see PTL 3, for example).

CITATION LIST

Patent Literature

[PTL 1] Japanese Patent Application Publication No. 2008-219995
[PTL 2] Japanese Patent Application Publication No. 2013-7731
[PTL 3] Japanese Patent Application Publication No. 2009-156852

SUMMARY OF INVENTION

Technical Problem

However, the prior art includes the following problems.
In PTL 1, an attempt to suppress the effect of the magnetic field generated by the armature on the sensor is made by providing the lid unit, but adding the lid unit leads to increases in the cost and overall weight of the product, and a reduction in productivity.

In PTL 2, effects from magnetic fields other than the magnetic field to be detected are suppressed by providing the magnetic induction unit, but adding the magnetic induction unit likewise leads to increases in the cost and overall weight of the product, and a reduction in productivity.

In PTL 3, the angle errors of the respective frequency components can be reduced by obtaining the estimated angle error signal using the detection errors of the respective frequency components, but order component errors having a known cause and order component errors having an unknown cause are both corrected without distinguishing therebetween, and as a result, over-correction or under-correction may occur. Moreover, Fourier transform is used to implement frequency analysis on the angle signal detected by the resolver, and therefore data obtained over a plurality of past periods are required. Hence, a processing load is greater than that of a simple correction operation, and as a result, mislearning may occur in a case where an error occurs in data stored in a RAM or the like.

This invention has been designed to solve the problems described above, and an object thereof is to obtain a simple, low-cost control device for an AC rotary machine with which an angular position of a rotor can be detected with a high degree of precision.

Solution to Problem

A control device for an AC rotary machine according to this invention controls an AC rotary machine in which a rotor is rotated by a rotating magnetic field formed by a multi-phase alternating current flowing through an armature winding of a stator, and includes: an inverter that applies a voltage to the armature winding of the AC rotary machine; an inverter connection unit that connects the armature winding to the inverter; a magnetic field generator that generates an angle detecting magnetic field for detecting a rotation angle of the AC rotary machine by rotating in synchronization with the rotor; an angle detector that detects two mutually orthogonal components of the angle detecting magnetic field generated by the magnetic field generator as a sine signal and a cosine signal; and a control calculation unit that controls a voltage applied to the inverter on the basis of a current command of the AC rotary machine and angle information obtained from the sine signal and the cosine signal, wherein the control calculation unit includes an angle correction calculation unit that corrects an error in the angle information caused by a noise magnetic field generated by a multi-phase alternating current flowing through the inverter connection unit by using a correction signal having a phase and an amplitude that are determined in accordance with a current vector of the multi-phase alternating current flowing through the inverter connection unit and a phase correction constant and an amplitude correction constant determined from a relative positional relationship between the inverter connection unit and the angle detector, and outputs the corrected error as a corrected electrical angle, and the control calculation unit controls the inverter on the basis of the corrected electrical angle.

Advantageous Effects of Invention

According to this invention, a detection error by the angle detector due to the noise magnetic field generated by the multi-phase alternating current flowing through the inverter connection unit is corrected using a correction signal having a phase and an amplitude that are determined in accordance with the relative positional relationship between the inverter connection unit and the angle detector and the current vector of the multi-phase alternating current. As a result, it is possible to obtain a simple, low-cost control device for an AC rotary machine with which an angular position of a rotor can be detected with a high degree of precision.

DESCRIPTION OF EMBODIMENTS

Figure 1:
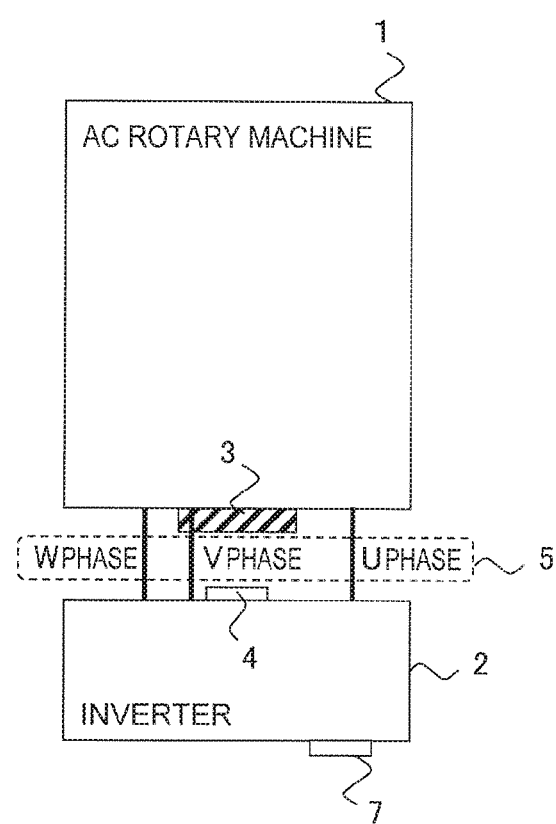
FIG. 1 is a schematic view showing a configuration of a control device for an AC rotary machine according to a first embodiment of this invention together with an AC rotary machine.

Preferred embodiments of a control device for an AC rotary machine according to this invention will be described below using the drawings. Note that identical or corresponding parts of the drawings will be described using identical reference numerals.

First Embodiment

FIG. 1 is a schematic view showing a configuration of a control device for an AC rotary machine according to a first embodiment of this invention together with an AC rotary machine. The control device for an AC rotary machine shown in FIG. 1 is used to control an AC rotary machine 1, and is configured to include an inverter 2, a magnetic field generator 3, an angle detector 4, an inverter connection unit 5, and a control calculation unit 7.

The AC rotary machine 1 includes a rotor and a stator, and the rotor is rotated by a rotating magnetic field formed by a three-phase alternating current flowing through an armature winding of the stator.

Note that in order to simplify the following description, a permanent magnet type synchronous rotary machine is envisaged as the AC rotary machine 1, but the AC rotary machine 1 according to the first embodiment is not limited thereto, and may be a field winding type synchronous rotary machine, for example.

When the number of pole pairs P of the AC rotary machine 1 is not 1, an electrical angle $\theta e$, i.e. the phase of the AC rotary machine 1 within an electric period, and a mechanical angle $\theta m$, i.e. the phase of the AC rotary machine 1 within a mechanical period, vary at different rates. For example, when the number of pole pairs is 2, the electrical angle $\theta e$ varies at twice the speed of the mechanical angle $\theta m$. The electrical angle $\theta e$ can be expressed as shown below in Equation (1) using the number of pole pairs P and the mechanical angle $\theta m$.

[Math. 1]

$$\theta_e = P\theta_m \quad (1)$$

The inverter 2 implements power conversion on a DC voltage supplied from a DC power supply by controlling a semiconductor switch in accordance with a switching signal output by the control calculation unit 7. The power-converted voltage is applied to the armature winding of the AC rotary machine 1 via the inverter connection unit 5. The inverter 2 generates torque in the AC rotary machine 1 by applying an appropriate voltage to the armature winding of the AC rotary machine 1 in accordance with the electrical angle θe so that a three-phase alternating current passes through the armature winding.

The inverter connection unit 5 connects the armature winding of the AC rotary machine 1 to the inverter 2. As shown in FIG. 1, the inverter connection unit 5 according to the first embodiment is constituted by three connection wires through which a U phase, a V phase, and a W phase of the three-phase alternating current are respectively passed.

The magnetic field generator 3 generates an angle detecting magnetic field for detecting the mechanical angle of the AC rotary machine 1 by rotating in synchronization with the rotor. A permanent magnet provided on one end of a rotary shaft of the rotor, for example, may be used as the magnetic field generator 3.

Since the magnetic field generator 3 rotates in synchronization with the rotor, a rotation angle θsm of the magnetic field generator 3 is equal to the mechanical angle θm of the AC rotary machine 1, and therefore Equation (2), shown below, is established. Note that Equation (2) shows a case in which respective initial phases of the rotation angle θsm and the mechanical angle θm are identical, but when the initial phases are different, an offset corresponding to the initial phase difference should be inserted.

[Math. 2]

$$\theta_m \theta_{sm} \quad (2)$$

The angle detector 4 detects two mutually orthogonal components of the angle detecting magnetic field generated by the magnetic field generator 3 as a sine signal Vsin and a cosine signal Vcos. A magnetic sensor provided in a position opposing the magnetic field generator 3 on an extension of the rotary shaft of the rotor, for example, may be used as the angle detector 4.

Here, similarly to the electrical angle θe described above, when a shaft angle multiplier Psns of the angle detector 4 itself is not 1, a detection angle θsns of the angle detector 4 and the rotation angle θsm of the magnetic field generator 3 vary at different rates. The detection angle θsns can be expressed as shown below in Equation (3) using the shaft angle multiplier Psns of the angle detector 4 and the rotation angle θsm of the magnetic field generator 3.

[Math. 3]

$$\begin{cases} \theta_{sns} = P_{sns}\theta_{sm} \\ \theta_{sns} = \tan^{-1}\dfrac{V_{sin}}{V_{cos}} \end{cases} \quad (3)$$

Note that Equation (3) shows a case in which respective maximum amplitudes of the sine signal Vsin and the cosine signal Vcos detected by the angle detector 4 are equal such that a phase difference therebetween is π/2, or in other words a case in which respective offset errors of the sine signal Vsin and the cosine signal Vcos are both 0. When offset errors exist, Equation (3) can be corrected by offsetting respective offset errors esin_ofs, ecos_ofs of the sine signal Vsin and the cosine signal Vcos, as shown below in Equation (4), for example.

[Math. 4]

$$\theta_{sns} = \tan^{-1}\dfrac{V_{sin} - e_{sin\_ofs}}{V_{cos} - e_{cos\_ofs}} \quad (4)$$

Here, since Equation (2) is established, as described above, the electrical angle θe of the AC rotary machine 1 can be expressed as shown below in Equation (5) using the number of pole pairs P of the AC rotary machine 1 and the shaft angle multiplier Psns and detection angle θsns of the angle detector 4. In other words, the electrical angle θe of the AC rotary machine 1 is expressed by the product of the detection angle θsns and Kp, which is a ratio of the number of pole pairs of the AC rotary machine 1 to the shaft angle multiplier of the angle detector 4.

[Math. 5]

$$\begin{cases} \theta_e = K_p \theta_{sns} \\ K_p = \dfrac{P}{P_{sns}} \end{cases} \quad (5)$$

The control calculation unit 7 implements coordinate conversion, for example, on the three-phase alternating current flowing through the inverter connection unit 5 using the electrical angle θe of the AC rotary machine 1, which is obtained from the sine signal and the cosine signal detected by the angle detector 4, and executes feedback control to bring a deviation between the three-phase alternating current and a current command to zero. Needless to mention, as long as the desired current is obtained, similar effects can be obtained using another method such as executing feedforward control using specifications of the AC rotary machine 1 and the inverter 2, and the electrical angle θe. The control calculation unit 7 is constituted by a microprocessor having a CPU (Central Processing Unit) and a storage unit storing a program, for example.

Next, a noise magnetic field generated by the three-phase alternating current flowing through the inverter connection unit 5 in the position of the angle detector 4 will be described.

Figure 2:
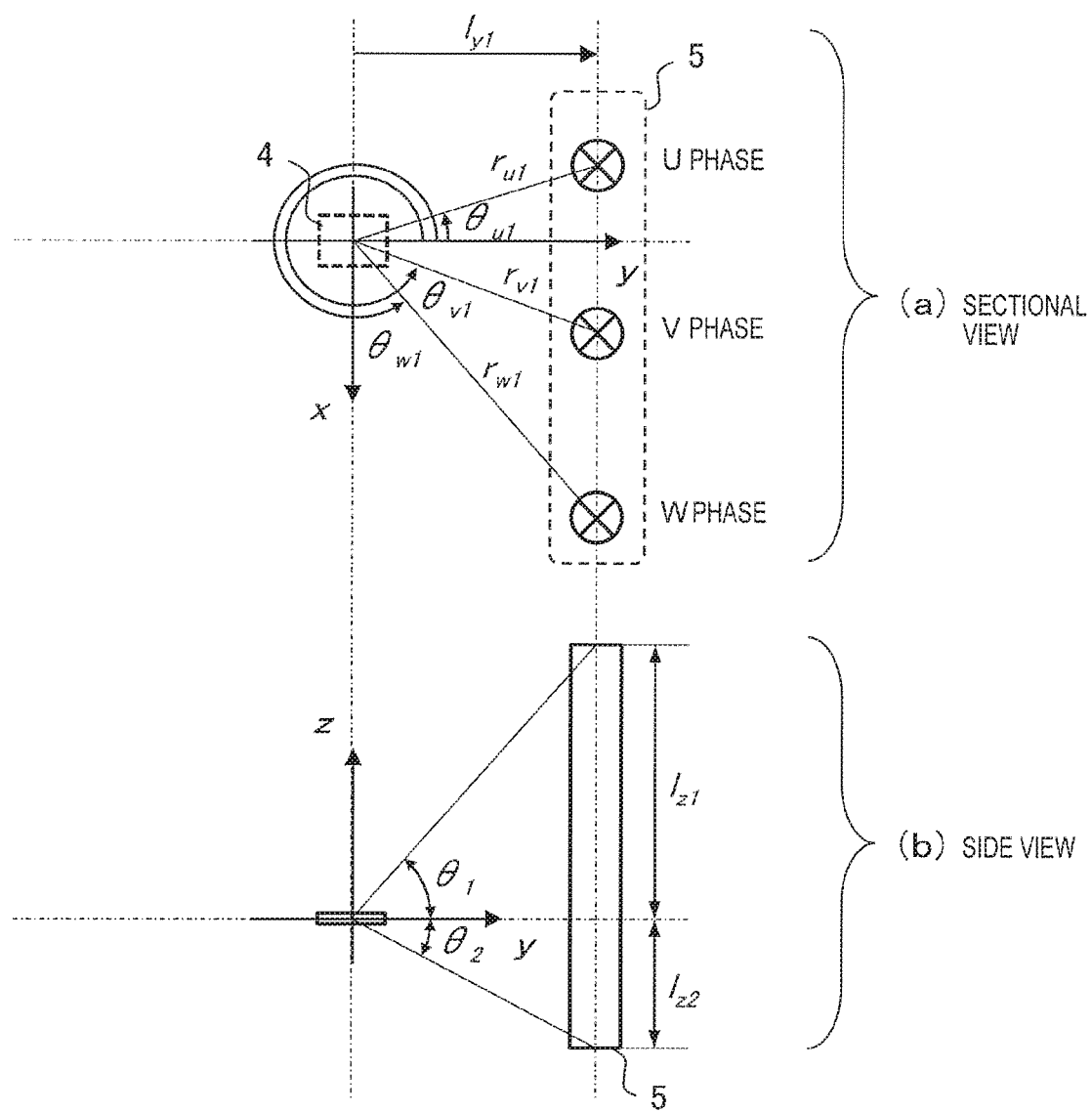
FIG. 2 is a sectional view and a side view showing a relative positional relationship between an angle detector and an inverter connection unit of the control device for an AC rotary machine according to the first embodiment of this invention.

FIG. 2 is a sectional view and a side view showing a relative positional relationship between the angle detector 4 and the inverter connection unit 5 of the control device for an AC rotary machine according to the first embodiment of this invention. FIG. 2(a) shows an x axis and a y axis serving as two detection axes of the angle detector 4. FIG. 2(b) shows a z axis extending along the rotary shaft of the rotor. The x axis, the y axis, and the z axis are mutually orthogonal.

Further, FIG. 2 shows a relative distance r and a relative angle θ between the angle detector 4 and the inverter connection unit 5. Here, subscript appended to the relative distance r and the relative angle θ indicates the phase. The relative distance r can be expressed as shown below in Equation (6) using a y axis component Iy1 thereof and the relative angle θ.

[Math. 6]

$$\begin{cases} r_{u1} = \dfrac{l_{y1}}{|\cos\theta_{u1}|} \\ r_{v1} = \dfrac{l_{y1}}{|\cos\theta_{v1}|} \\ r_{w1} = \dfrac{l_{y1}}{|\cos\theta_{w1}|} \end{cases} \quad (6)$$

FIG. 2 shows an example in which the inverter connection unit 5 is disposed further toward a positive direction side (the right side) of the y axis than the angle detector 4, and therefore Equation (7) is established as shown below. Note that the inverter connection unit 5 may be disposed further toward a negative direction side (the left side) of the y axis than the angle detector 4. Alternatively, the three phases of the inverter connection unit 5 may be dispersed over the left and right sides of the y axis. In this case, the right side of a relational expression relating to a phase disposed on the left side should be multiplied by −1.

[Math. 7]

$$\begin{cases} r_{u1} = \dfrac{l_{y1}}{\cos\theta_{u1}} \\ r_{v1} = \dfrac{l_{y1}}{\cos\theta_{v1}} \\ r_{w1} = \dfrac{l_{y1}}{\cos\theta_{w1}} \end{cases} \quad (7)$$

Further, as shown in FIG. 2(b), the length of the inverter connection unit 5 is expressed using the position of the angle detector 4 as a reference such that a length thereof on the positive direction side of the z axis is set as $1z1$ and a length thereof on the negative direction side of the z axis is set as $1z2$. Furthermore, a relative angle formed by an end portion of the inverter connection unit 5 on the positive direction side of the z axis and the angle detector 4 is set as $\theta1$, and a relative angle formed by an end portion of the inverter connection unit 5 on the negative direction side of the z axis and the angle detector 4 is set as $\theta2$.

At this time, a noise magnetic field Bi generated by three-phase alternating currents iu1, iv1, iw1 flowing through the inverter connection unit 5 in the position of the angle detector 4 is expressed by Equation (8), shown below. Here, μ0 denotes the magnetic permeability of a vacuum.

[Math. 8]

$$\begin{cases} B_{iu1\_x} = -\dfrac{\mu_0 i_{u1}}{4\pi r_{u1}}(\sin\theta_1 + \sin\theta_2)\cos\theta_{u1} & B_{iu1\_y} = -\dfrac{\mu_0 i_{u1}}{4\pi r_{u1}}(\sin\theta_1 + \sin\theta_2)\sin\theta_{u1} \\ B_{iv1\_x} = -\dfrac{\mu_0 i_{v1}}{4\pi r_{v1}}(\sin\theta_1 + \sin\theta_2)\cos\theta_{v1} & B_{iv1\_y} = -\dfrac{\mu_0 i_{v1}}{4\pi r_{v1}}(\sin\theta_1 + \sin\theta_2)\sin\theta_{v1} \\ B_{iw1\_x} = -\dfrac{\mu_0 i_{w1}}{4\pi r_{w1}}(\sin\theta_1 + \sin\theta_2)\cos\theta_{w1} & B_{iw1\_y} = -\dfrac{\mu_0 i_{w1}}{4\pi r_{w1}}(\sin\theta_1 + \sin\theta_2)\sin\theta_{w1} \end{cases} \quad (8)$$

Figure 3:
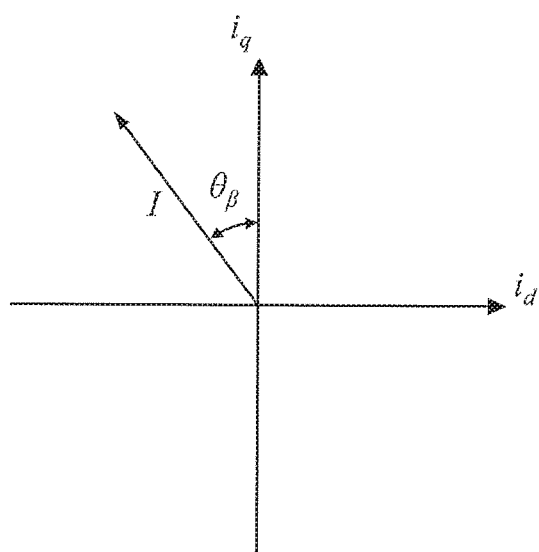
FIG. 3 is an illustrative view showing a current vector on a rotating coordinate system.

FIG. 3 is an illustrative view showing a current vector on a rotary coordinate system. When an absolute value of the current vector is set as I and a phase angle thereof relative to a q axis is set as $\theta\beta$, a d axis component id and a q axis component iq of the current vector are as shown below in Equation (9).

[Math. 9]

$$\begin{cases} i_d = -I\sin\theta_\beta \\ i_q = I\cos\theta_\beta \end{cases} \quad (9)$$

According to Equations (3) and (5), the electrical angle $\theta e$ of the AC rotary machine 1 is obtained from the sine signal Vsin and the cosine signal Vcos detected by the angle detector 4, and therefore the three-phase alternating current flowing through the inverter connection unit 5 is expressed as shown below in Equation (10). Here, $\sqrt{2}\times I_{rms}$ denotes the amplitude of the three-phase alternating current.

[Math. 10]

$$\begin{cases} i_{u1} = \sqrt{2}\, I_{rms}\sin(\theta_e + \theta_\beta - \pi) \\ i_{v1} = \sqrt{2}\, I_{rms}\sin\left(\theta_e + \theta_\beta + \dfrac{\pi}{3}\right) \\ i_{w1} = \sqrt{2}\, I_{rms}\sin\left(\theta_e + \theta_\beta - \dfrac{\pi}{3}\right) \end{cases} \quad (10)$$

Note that for simplicity, the three-phase alternating current is set as a sine wave in Equation (10), and only a first order (a fundamental period) component of the electrical angle $\theta e$ is shown. However, when a higher order component of the electrical angle $\theta e$ is included, such as in the case of trapezoidal wave driving, for example, a term including an $n^{th}$ order component (where n is a natural number not smaller than 2) of the electrical angle $\theta e$ should be added to Equation (10) (for example, Equation (10) should be expressed as a Fourier series).

According to Equations (7), (8), and (10), the noise magnetic field Bi generated by the three-phase alternating current flowing through the inverter connection unit 5 in the position of the angle detector 4 is expressed by Equation (11), shown below.

[Math. 11]

$$\begin{cases} B_{i\_x} = -\dfrac{\sqrt{2}\,\sqrt{A^2 + B^2}\,\mu_0 I_{rms}(\sin\theta_1 + \sin\theta_2)}{8\pi l_{y1}}\sin(\theta_e + \theta_\beta + \delta_x) \\ B_{i\_y} = -\dfrac{\sqrt{2}\,\sqrt{C^2 + D^2}\,\mu_0 I_{rms}(\sin\theta_1 + \sin\theta_2)}{8\pi l_{y1}}\sin(\theta_e + \theta_\beta + \delta_y) \end{cases} \quad (11)$$

$$\begin{cases} A = -\cos2\theta_{u1} + \frac{1}{2}(\cos2\theta_{v1} + \cos2\theta_{w1}) & B = \frac{\sqrt{3}}{2}(\cos2\theta_{v1} - \cos2\theta_{w1}) \\ \sin\delta_x = \frac{B}{\sqrt{A^2+B^2}} & \cos\delta_x = \frac{A}{\sqrt{A^2+B^2}} \\ C = -\sin2\theta_{u1} + \frac{1}{2}(\sin2\theta_{v1} + \sin2\theta_{w1}) & D = \frac{\sqrt{3}}{2}(\sin2\theta_{v1} - \sin2\theta_{w1}) \\ \sin\delta_y = \frac{D}{\sqrt{C^2+D^2}} & \cos\delta_y = \frac{C}{\sqrt{C^2+D^2}} \end{cases}$$

Meanwhile, an angle detecting magnetic field Bbase generated by the magnetic field generator 3 in the position of the angle detector 4 is given by Equation (12), shown below.

[Math. 12]

$$\begin{cases} B_{base\_x} = B_{base}\cos\theta_{sns} \\ B_{base\_y} = B_{base}\sin\theta_{sns} \end{cases} \quad (12)$$

Hence, in actuality, the angle detector 4 detects a synthesized magnetic field Ball obtained by superimposing the noise magnetic field Bi shown in Equation (11) on the angle detecting magnetic field Bbase shown in Equation (12), as shown below in Equation (13).

[Math. 13]

$$\begin{cases} B_{all\_x} = B_{base\_x} + B_{i\_x} \\ B_{all\_y} = B_{base\_y} + B_{i\_y} \end{cases} \quad (13)$$

When the magnitude of the angle detecting magnetic field Bbase is approximately 100 (mT) and the magnitude of the noise magnetic field Bi is approximately 1 (mT), for example, an error of approximately 1% is superimposed on a detection value obtained by the angle detector 4.

Next, a method of correcting the effect of the noise magnetic field Bi shown in Equation (11), which is included in the synthesized magnetic field Ball actually detected by the angle detector 4, as shown in Equation (13), will be described.

Figure 4:
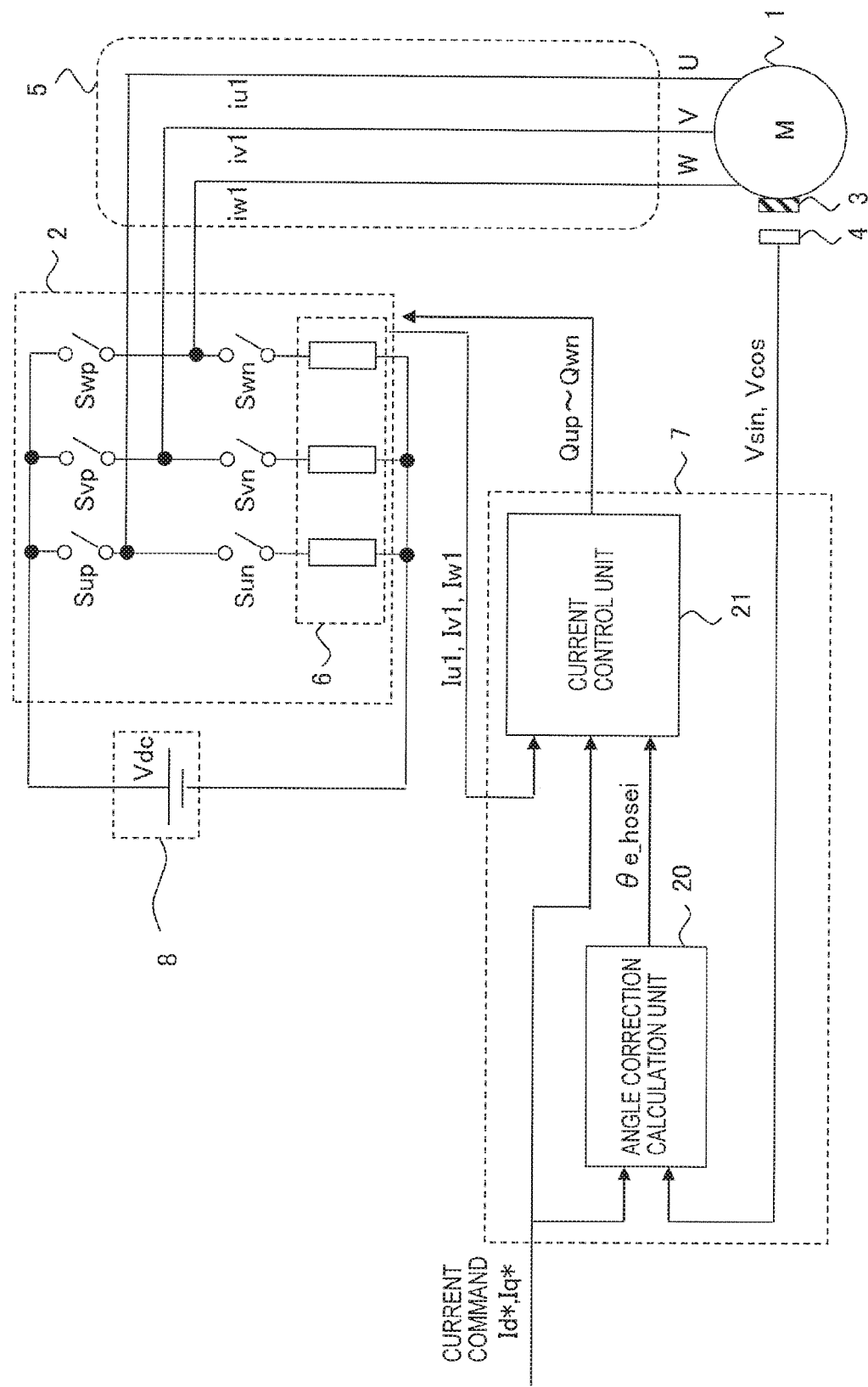
FIG. 4 is a block diagram showing the control device for an AC rotary machine according to the first embodiment of this invention together with the AC rotary machine.

FIG. 4 is a circuit diagram showing the control device for the AC rotary machine according to the first embodiment of this invention together with the AC rotary machine. The control device for an AC rotary machine shown in FIG. 4 is used to control the AC rotary machine 1, and is configured to include the inverter 2, the magnetic field generator 3, the angle detector 4, the inverter connection unit 5, a current detector 6, and the control calculation unit 7.

A DC power supply 8 supplies a DC voltage Vdc to the inverter 2. A device that outputs a DC voltage, such as a battery, a DC-DC converter, a diode rectifier, or a PWM rectifier, for example, may be used as the DC power supply 8.

The inverter 2 converts the DC voltage Vdc supplied by the DC power supply 8 into a three-phase alternating current by controlling semiconductor switches Sup to Swn in accordance with switching signals Qup to Qwn output by the control calculation unit 7. The three-phase alternating current is supplied to the armature winding of the AC rotary machine 1 via the inverter connection unit 5.

Here, the switching signals Qup, Qun, Qvp, Qvn, Qwp, Qwn are control signals for switching the semiconductor switches Sup, Sun, Svp, Svn, Swp, Swn of the inverter 2 respectively ON and OFF.

Each of the semiconductor switches Sup to Swn is constituted by a semiconductor switch such as an IGBT, a bipolar transistor, or a MOS power transistor, and a diode connected in anti-parallel to the semiconductor switch, for example.

The current detector 6 is provided between a lower arm of each phase of the inverter 2 and a ground of the DC power supply 8 in order to detect the three-phase alternating currents iu1, iv1, iw1 flowing through the respective phases of the inverter connection unit 5. Note that instead of detecting all three phases of the three-phase alternating current, it is possible to detect only two phases and obtain the remaining phase by calculation, using the fact that a vector sum of the three-phase alternating current is 0. The current detector 6 may also be provided between an upper arm of each phase of the inverter 2 and a positive electrode side of the DC power supply 8. Moreover, the current detector 6 may calculate the three-phase alternating current using a method of detecting a bus current value by shifting a switching timing of the inverter 2 in order to secure a current detection time.

The control calculation unit 7 is configured to include an angle correction calculation unit 20 and a current control unit 21.

The angle correction calculation unit 20 corrects the errors in the sine signal Vsin and the cosine signal Vcos caused by the noise magnetic field generated by the three-phase alternating current flowing through the inverter connection unit 5, and outputs the result as a corrected electrical angle θe_hosei.

Here, as shown in FIG. 4, the angle correction calculation unit 20 calculates the noise magnetic field on the basis of a current vector obtained from current commands id*, iq*. Note that the current vector can also be obtained from the three-phase alternating currents iu1, iv1, iw1 detected by the current detector 6. Needless to mention, the current vector may also be obtained using values that have been passed through a low pass filter or the like in order to remove noise therefrom. A case in which the current vector is obtained from the current commands id*, iq* will be described below.

The current control unit 21 converts the three-phase alternating currents iu1, iv1, iw1 flowing through the inverter connection unit 5 into detected currents id1, iq1 on a rotating coordinate system using the corrected electrical angle θe_hosei, calculates voltage commands Vu, Vv, Vw by means of feedback control so that the externally input current commands id*, iq* equal the detected currents id1, iq1, and outputs the switching signals Qup to Qwn to the inverter 2 by means of pulse width modulation (PWM modulation) corresponding to the voltage commands Vu, Vv, Vw.

Further, the feedback control implemented on the three-phase alternating currents iu1, iv1, iw1 may be replaced with appropriate feedforward control for the AC rotary machine 1, and in this case, the current detector 6 and the values of the three-phase alternating currents iu1, iv1, iw1 detected by the current detector 6 are no longer required.

Figure 5A:
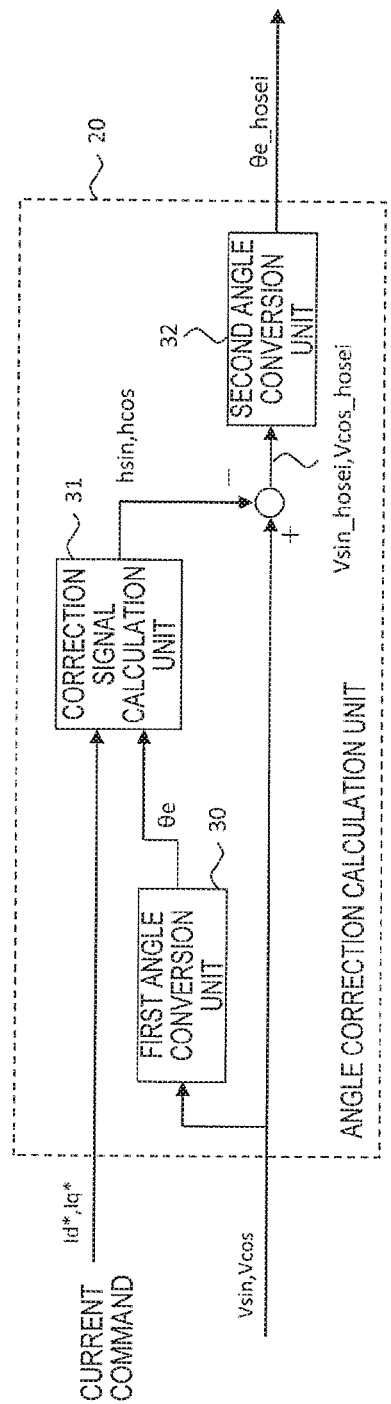
FIG. 5A is a first block diagram showing an angle correction calculation unit of the control device for an AC rotary machine according to the first embodiment of this invention.

FIG. 5A is a block diagram showing the angle correction calculation unit 20 of the control device for an AC rotary machine according to the first embodiment of this invention. The angle correction calculation unit 20 according to the first embodiment is configured to include a first angle conversion unit 30, a correction signal calculation unit 31, and a second angle conversion unit 32.

The first angle conversion unit 30 calculates the detection angle θsns in accordance with Equation (3) from the sine signal Vsin and the cosine signal Vcos detected by the angle detector 4, calculates the electrical angle θe in accordance with Equation (5), and outputs the result as angle information.

The correction signal calculation unit 31 determines the phase angle θβ in accordance with Equation (9) from the externally input current commands id*, iq*, and calculates a sine signal correction signal hsin and a cosine signal correction signal hcos in accordance with Equation (14), shown below, from the current vector, the phase angle θβ, and the electrical angle θe constituting the angle information obtained by the first angle conversion unit 30.

[Math. 14]

$$\begin{cases} h_{sin} = K_{sin}I_{rms}\sin(\theta_e + \theta_\beta + \delta_y) \\ h_{cos} = K_{cos}I_{rms}\sin(\theta_e + \theta_\beta + \delta_x) \end{cases} \quad (14)$$

As noted above, either the current commands id*, iq* or the three-phase alternating currents iu1, iv1, iw1 detected by the current detector 6 may be used as the current vector used to calculate the sine signal correction signal hsin and the cosine signal correction signal hcos.

Here, phase correction constants λx, λy are constants determined from the relative positional relationship between the inverter connection unit 5 and the angle detector 4, and are given by Equation (11), shown above. Amplitude correction constants Ksin, Kcos are also constants determined from the relative positional relationship between the inverter connection unit 5 and the angle detector 4, and are given by Equation (15), shown above.

[Math. 15]

$$\begin{cases} K_{sin} = -\dfrac{\sqrt{2}\sqrt{C^2+D^2}\,\mu_0(\sin\theta_1+\sin\theta_2)}{8\pi l_{y1}B_{base}}A_{sin} \\ K_{cos} = -\dfrac{\sqrt{2}\sqrt{A^2+B^2}\,\mu_0(\sin\theta_1+\sin\theta_2)}{8\pi l_{y1}B_{base}}A_{cos} \end{cases} \quad (15)$$

Note that the amplitude correction constants Ksin, Kcos are commensurate with fundamental wave amplitudes Asin, Acos of the sine signal Vsin and the cosine signal Vcos output by the angle detector 4, but when the fundamental wave amplitudes Asin, Acos do not vary in response to environmental temperature variation and variation over time, the fundamental wave amplitudes Asin, Acos may be set as constants. When the fundamental wave amplitudes Asin, Acos vary in response to environmental temperature variation and variation over time, on the other hand, the fundamental wave amplitudes Asin, Acos may be set as variables of temperature or time. Furthermore, when the fundamental wave amplitudes vary greatly, the amplitude correction constants may be obtained using actual fundamental wave amplitudes by multiplying the actual fundamental wave amplitudes by a part other than the fundamental wave amplitude.

Here, it is evident from a comparison of Equation (10) with Equation (14) that the sine signal correction signal hsin and the cosine signal correction signal hcos are obtained by implementing phase and amplitude adjustments on the three-phase alternating currents iu1, iv1, iw1 flowing through the inverter connection unit 5. More specifically, in Equation (14), the phase correction constant λx or λy is added to the phase and the amplitude correction constant Ksin or Kcos is multiplied by the amplitude with respect to a basic alternating current hbase shown below in Equation (16).

[Math. 16]

$$h_{base} = I_{rms}\sin(\theta_e + \theta_\beta) \quad (16)$$

In other words, the sine signal correction signal hsin and the cosine signal correction signal hcos are represented by sine waves having an amplitude value obtained by multiplying the absolute value of the current vector by the amplitude correction constant determined from the current commands id*, iq* or the detected currents id1, iq1, and a phase value obtained by adding the electrical angle θe and the phase correction constant to the phase angle θβ relative to the q axis of the current vector determined from the current commands id*, iq* or the detected currents id1, iq1.

The phase correction constants and the amplitude correction constants determined from the relative positional relationship between the inverter connection unit 5 and the angle detector 4 may be calculated in advance and stored in a storage unit, not shown in the drawings, of the control calculation unit 7, for example. Further, when the fundamental wave amplitudes vary greatly, the amplitude correction constants may be obtained by storing a part other than the fundamental wave amplitude and multiplying this part by the fundamental wave amplitude during use. Hence, using Equation (14), the sine signal correction signal hsin and the cosine signal correction signal hcos can be calculated by means of simple calculations merely by adjusting the phase and the amplitude in relation to the basic alternating current hbase.

The second angle conversion unit 32 calculates the corrected electrical angle θe_hosei in accordance with Equations (3) and (5) from respective difference signals between the sine signal Vsin and the sine signal correction signal hsin and between the cosine signal Vcos and the cosine signal correction signal hcos.

Figure 5B:
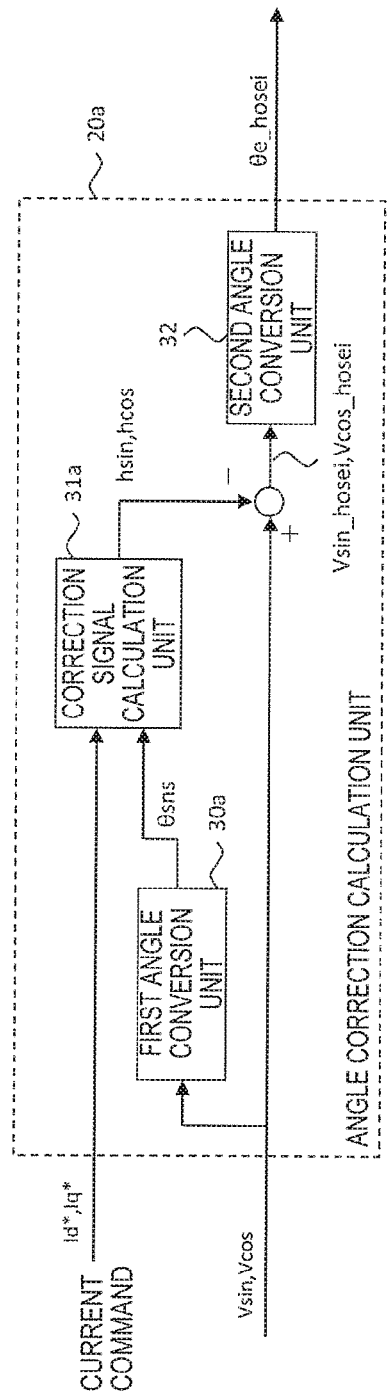
FIG. 5B is a second block diagram showing the angle correction calculation unit of the control device for an AC rotary machine according to the first embodiment of this invention.

In FIG. 5A, the angle information used to calculate the sine signal correction signal hsin and the cosine signal correction signal hcos is constituted by the electrical angle θe, but an angle correction calculation unit 20a such as that shown in FIG. 5B, which uses the detection angle θsns, may be employed instead. The angle correction calculation unit 20a shown in FIG. 5B differs from the angle correction calculation unit 20 shown in FIG. 5A with respect to a first angle conversion unit 30a and a correction signal calculation unit 31a.

In FIG. 5B, the first angle conversion unit 30a calculates the detection angle θsns as the angle information in accordance with Equation (3) from the sine signal Vsin and the cosine signal Vcos detected by the angle detector 4.

The correction signal calculation unit 31a determines the phase angle θβ in accordance with Equation (9) from the externally input current commands id*, iq*, and calculates the sine signal correction signal hsin and the cosine signal correction signal hcos in accordance with Equation (17), shown below, from the current vector, the phase angle θβ, and the detection angle θsns constituting the angle information obtained by the first angle conversion unit 30a.

[Math. 17]

$$\begin{cases} h_{sin} = K_{sin}I_{rms}\sin\left(\dfrac{P}{P_{sns}}\theta_{sns} + \theta_\beta + \delta_y\right) \\ h_{cos} = K_{cos}I_{rms}\sin\left(\dfrac{P}{P_{sns}}\theta_{sns} + \theta_\beta + \delta_x\right) \end{cases} \quad (17)$$

Figure 5C:
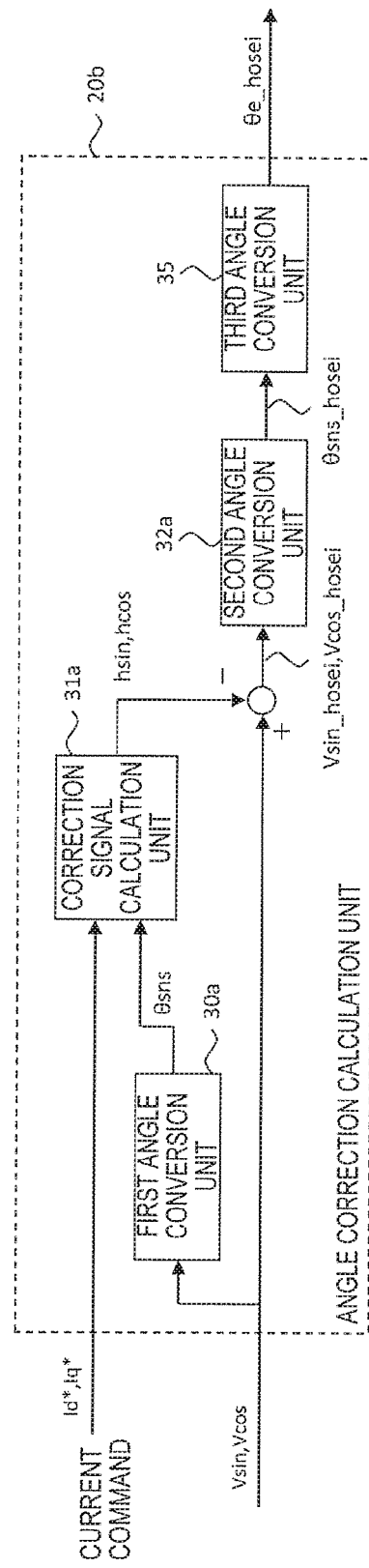
FIG. 5C is a third block diagram showing the angle correction calculation unit of the control device for an AC rotary machine according to the first embodiment of this invention.

Alternatively, an angle correction calculation unit 20b such as that shown in FIG. 5C may be used. The angle correction calculation unit 20b shown in FIG. 5C differs from the angle correction calculation unit 20a shown in FIG. 5B with respect to a second angle conversion unit 32a and a third angle conversion unit 35.

In FIG. 5C, the second angle conversion unit 32a calculates a corrected detection angle θsns_hosei in accordance with Equation (3) from the respective difference signals between the sine signal Vsin and the sine signal correction signal hsin and between the cosine signal Vcos and the cosine signal correction signal hcos.

The third angle conversion unit 35 calculates the corrected electrical angle θe_hosei in accordance with Equation (5) from the corrected detection angle θsns_hosei.

Similar effects to those of the configuration shown in FIG. 5A can be obtained with the configurations shown in both FIG. 5B and FIG. 5C. Note that FIG. 5A, FIG. 5B, and FIG. 5C show example configurations of the angle correction calculation unit, and as long as the angle information that is input into the correction signal calculation unit can be obtained by multiplying the angles obtained from the sine signal Vsin and the cosine signal Vcos by a constant, the angle information may be used by the correction signal calculation unit as a correction signal. Needless to mention, when the initial phases of the detection angle θsns and the electrical angle θe deviate from each other, the detection angle θsns and the electrical angle θe cannot simply be multiplied by a constant, and instead, an offset component thereof must be adjusted.

As a result, the electrical angle θe can be detected with a high degree of precision using the corrected electrical angle θe_hosei, in which the effect of the noise magnetic field Bi has been reduced, instead of the electrical angle θe including the effect of the noise magnetic field Bi.

When the calculations of the current control unit 21 are implemented using the corrected electrical angle θe_hosei, an error component superimposed during coordinate conversion for converting the three-phase alternating currents iu1, iv1, iw1 into the detected currents id1, iq1, coordinate conversion implemented to obtain the switching signals Qup to Qwn from the voltage commands that are obtained by applying a method such as feedforward control or feedback control to the current commands id*, iq*, and so on can be reduced or removed, and as a result, a current ripple can be suppressed, which is an effect not present in the prior art.

When the control device for an AC rotary machine according to the first embodiment is used to assist steering torque in an electric power steering, for example, a torque ripple included in the output torque of the AC rotary machine 1 is suppressed, and as a result, a comfortable steering feeling can be obtained.

Note that in the above description, a three-phase alternating current flows through the inverter connection unit 5, but similar effects can be obtained when a multi-phase alternating current having more than three phases flows through the inverter connection unit 5.

Further, in the above description, the three-phase alternating current is represented only by the first order (fundamental period) component of the electrical angle θe, but even when a term including an $n^{th}$ order component (where n is a natural number not smaller than 2) of the electrical angle θe is included in Equation (10) (when Equation (10) is expressed as a Fourier series, for example), a formula corresponding to Equation (14) can be obtained by similar procedures due to the ability to superimpose the magnetic field.

More specifically, when the three-phase alternating current includes a higher order component of the electrical angle θe, a term relating to an $n^{th}$ order sine wave (where n is a natural number not smaller than 2) having an amplitude value obtained by multiplying by the amplitude correction constant the absolute value of the current vector of the current commands id*, iq* or the detected currents id1, iq1 and a phase value obtained by adding the $n^{th}$ order component of the electrical angle θe and the phase correction constant to the phase angle θβ relative to the q axis of the current vector of the current commands id*, iq* or the detected currents id1, iq1 is further included in the sine signal correction signal hsin and the cosine signal correction signal hcos.

Furthermore, in the above description, a normal operation in which the three-phase alternating current flows normally through all of the connection wires of the inverter connection unit 5 is envisaged, but a formula corresponding to Equation (14) can be obtained by implementing similar procedures even when a fault occurs such that the three-phase alternating current does not flow through one or more of the connection wires.

Hence, even when a fault occurs such that one or more of the phases of the three-phase alternating current is not supplied to the inverter connection unit 5, the error produced by the angle detector 4 due to the noise magnetic field can be corrected by calculating the sine signal correction signal hsin and the cosine signal correction signal hcos in relation to the connection wires through which the current flows using a formula corresponding to Equation (14). Note that when the formula corresponding to Equation (14) cannot easily be represented by a simple formula, waveform values corresponding to electrical angles may be prepared in advance in the form of a table.

Note that in the first embodiment, the sine signal correction signal hsin and the cosine signal correction signal hcos are both corrected, but in a case where the error in one of the signals is small or the like, similar effects can be obtained by correcting only one of the signals. Moreover, even when the errors in the two signals are identical, a smaller angle correction effect can be obtained by correcting either the sine signal correction signal hsin or the cosine signal correction signal hcos alone in consideration of a processing load or the like.

In the first embodiment, as described above, a detection error produced by an angle detector due to a noise magnetic field generated by a multi-phase alternating current flowing through an inverter connection unit is corrected using a correction signal having a phase and an amplitude that are determined in accordance with a relative positional relationship between the inverter connection unit and the angle detector and the value of the multi-phase alternating current. As a result, it is possible to obtain a simple, low-cost control device for an AC rotary machine with which an angular position of a rotor can be detected with a high degree of precision.

Second Embodiment

Figure 6A:
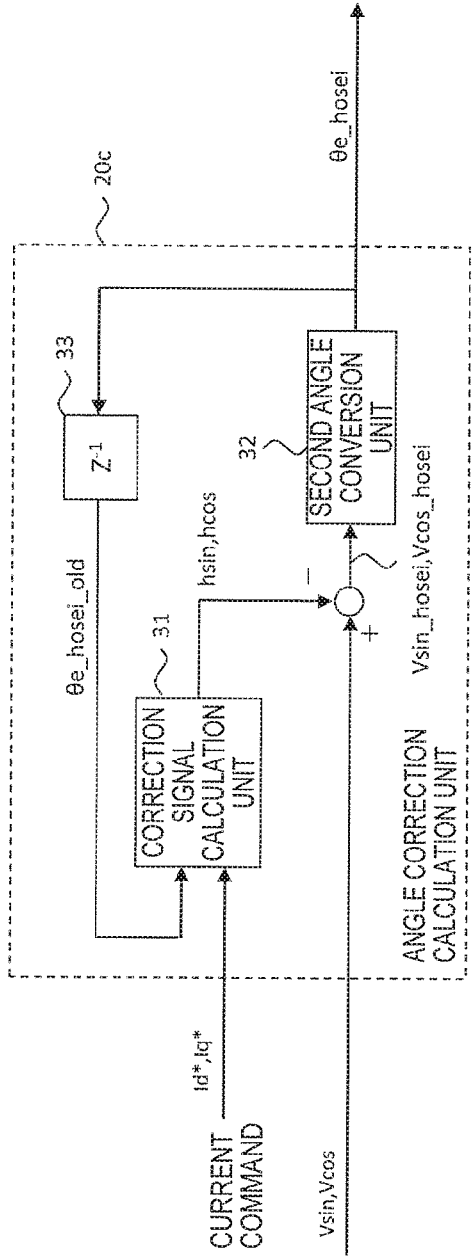
FIG. 6A is a first block diagram showing an angle correction calculation unit of a control device for an AC rotary machine according to a second embodiment of this invention.

FIG. 6A is a block diagram showing an angle correction calculation unit 20c of a control device for an AC rotary machine according to a second embodiment of this invention. The angle correction calculation unit 20c according to the second embodiment, shown in FIG. 6A, differs from that of the first embodiment, shown in FIG. 5A, in that a previous value θe_hosei_old of the corrected electrical angle θe_hosei is input into the correction signal calculation unit 31 instead of the electrical angle θe.

The correction signal calculation unit 31 determines the phase angle θβ in accordance with Equation (9) from the externally input current commands id*, iq*, and calculates the sine signal correction signal hsin and the cosine signal correction signal hcos in accordance with Equation (18), shown below, from the current vector, the phase angle θβ, and the previous value θe_hosei_old of the corrected electrical angle.

[Math. 18]

$$\begin{cases} h_{sin} = K_{sin} I_{rms} \sin(\theta_{e\_hosei\_old} + \theta_\beta + \delta_y) \\ h_{cos} = K_{cos} I_{rms} \sin(\theta_{e\_hosei\_old} + \theta_\beta + \delta_x) \end{cases} \quad (18)$$

A previous value acquisition unit 33 is a block for obtaining the previous value, and here, the previous value acquisition unit 33 acquires the corrected electrical angle θe_hosei obtained during the previous calculation as the previous value θe_hosei_old.

Figure 6B:
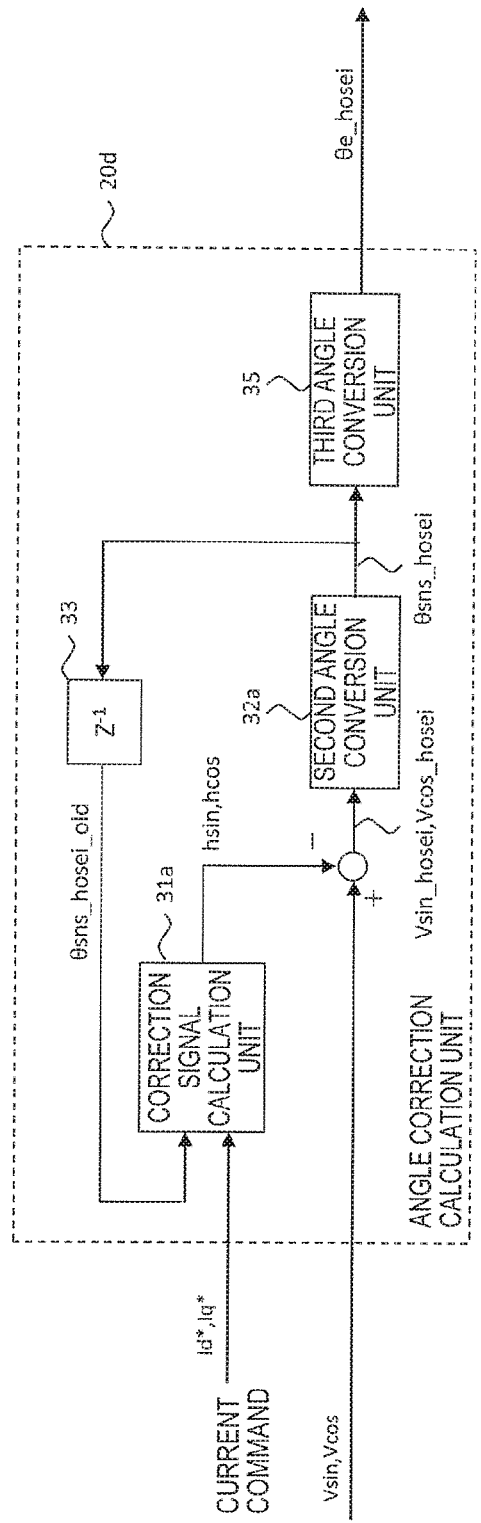
FIG. 6B is a second block diagram showing the angle correction calculation unit of the control device for an AC rotary machine according to the second embodiment of this invention.

Note that in FIG. 6A, the previous value θe_hosei_old of the corrected electrical angle is used to calculate the sine signal correction signal hsin and the cosine signal correction signal hcos, but an angle correction calculation unit 20d such as that shown in FIG. 6B, which uses a previous value θsns_hosei_old of the corrected detection angle, may be employed instead. The angle correction calculation unit 20d shown in FIG. 6B differs from the angle correction calculation unit 20c shown in FIG. 6A with respect to the correction signal calculation unit 31a, the second angle conversion unit 32a, and the third angle conversion unit 35.

In FIG. 6B, the correction signal calculation unit 31a determines the phase angle θβ in accordance with Equation (9) from the externally input current commands id*, iq*, and calculates the sine signal correction signal hsin and the cosine signal correction signal hcos in accordance with Equation (19), shown below, from the current vector, the phase angle θβ, and the previous value θsns_hosei_old of the corrected detection angle, which constitutes the angle information obtained by the previous value acquisition unit 33.

[Math. 19]

$$\begin{cases} h_{sin} = K_{sin} I_{rms} \sin\left(\frac{P}{P_{sns}} \theta_{sns\_hosei\_old} + \theta_\beta + \delta_y\right) \\ h_{cos} = K_{cos} I_{rms} \sin\left(\frac{P}{P_{sns}} \theta_{sns\_hosei\_old} + \theta_\beta + \delta_x\right) \end{cases} \quad (19)$$

The second angle conversion unit 32a calculates the corrected detection angle θsns_hosei in accordance with Equation (3) from the respective difference signals between the sine signal Vsin and the sine signal correction signal hsin and between the cosine signal Vcos and the cosine signal correction signal hcos.

The third angle conversion unit 35 calculates the corrected electrical angle θe_hosei in accordance with Equation (5) from the corrected detection angle θsns_hosei.

Similar effects to those of the configuration shown in FIG. 6A can be obtained with the configuration shown in FIG. 6B. Note that FIG. 6A and FIG. 6B show example configurations of the angle correction calculation unit, and as long as the angle information that is input into the correction signal calculation unit can be obtained by multiplying the detection angle θsns obtained from the respective difference signals between the sine signal Vsin and the sine signal correction signal hsin and between the cosine signal Vcos and the cosine signal correction signal hcos by a constant, the angle information may be used by the correction signal calculation unit as a correction signal. Needless to mention, when the initial phases of the detection angle θsns and the electrical angle θe deviate from each other, the detection angle θsns and the electrical angle θe cannot simply be multiplied by a constant, and instead, an offset component thereof must be adjusted.

Note that as the current vector used to calculate the sine signal correction signal hsin and the cosine signal correction signal hcos, either the current commands id*, iq* may be used, as shown in FIG. 6A, or the values of the three-phase alternating currents iu1, iv1, iw1 detected by the current detector 6 may be used.

Further, in the second embodiment, the sine signal correction signal hsin and the cosine signal correction signal hcos are both corrected, but in a case where the error in one of the signals is small or the like, similar effects can be obtained by correcting only one of the signals. Moreover, even when the errors in the two signals are identical, a smaller angle correction effect can be obtained by correcting either the sine signal correction signal hsin or the cosine signal correction signal hcos alone in consideration of the processing load or the like.

All other configurations and operations are identical to the first embodiment, and therefore description thereof has been omitted.

According to the second embodiment, as described above, the previous value of either the corrected detection angle θsns_hosei or the corrected electrical angle θe_hosei is employed instead of the detection angle θsns or the electrical angle θe as the angle information used by the correction signal calculation unit, and therefore the angle correction calculation unit can generate the correction signals on the basis of signals having a small angle error. As a result, the correction signals can be generated with a high degree of precision, which is an effect not present in the prior art.

Third Embodiment

Figure 7A:
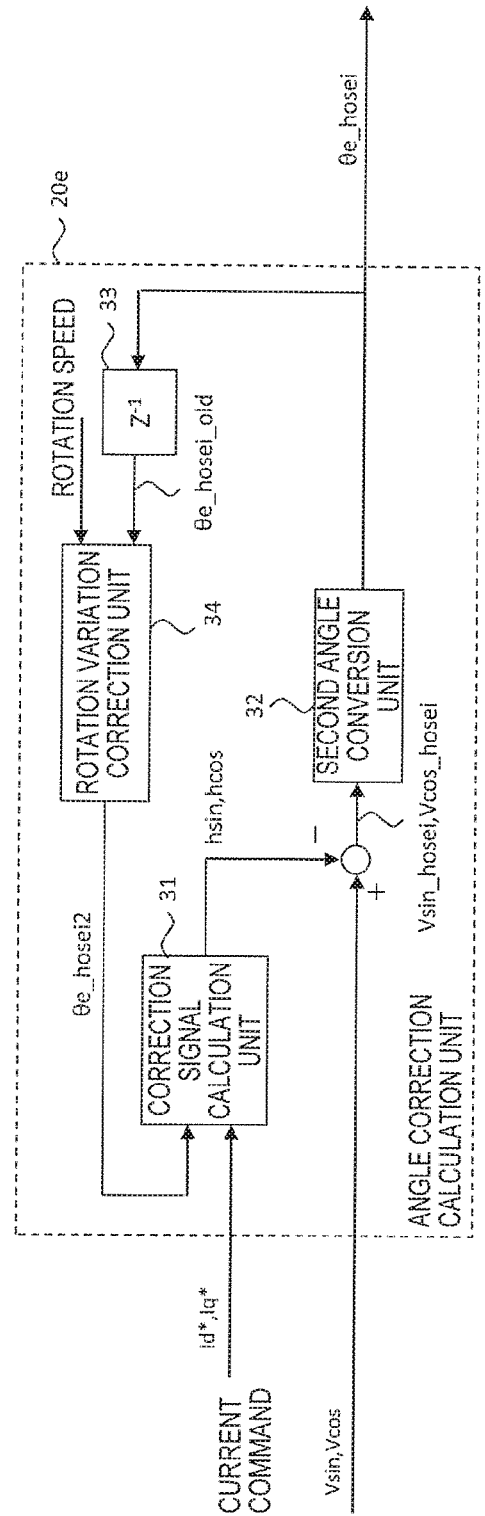
FIG. 7A is a first block diagram showing an angle correction calculation unit of a control device for an AC rotary machine according to a third embodiment of this invention.

FIG. 7A is a block diagram showing an angle correction calculation unit 20e of a control device for an AC rotary machine according to a third embodiment of this invention. The angle correction calculation unit 20e according to the third embodiment, shown in FIG. 7A, differs from that of the second embodiment, shown in FIG. 6A, in that a rotation variation correction unit 34 is provided to correct a previous calculation value of the corrected electrical angle θe_hosei on the basis of a temporal variation rate ωe of the electrical angle θe of the AC rotary machine 1.

The rotation variation correction unit 34 corrects the previous value θe_hosei_old of the corrected electrical angle, which constitutes the angle information obtained by the previous value acquisition unit 33, as shown below in Equation (20) by adding an angle variation amount thereto, the angle variation amount being a product of a time Δt from calculation of the previous value of the corrected electrical angle θe_hosei to the current calculation and the temporal variation rate ωe of the electrical angle θe of the AC rotary machine 1, and outputs the result as a second corrected electrical angle θe_hosei2. Here, the angle variation amount is obtained from the product of the time Δt from calculation of the previous value to the current calculation and the temporal variation rate ωe of the electrical angle θe of the AC rotary machine 1, but as long as the amount of angle variation occurring between calculation of the previous value and the current calculation can be obtained, another method may be employed.

[Math. 20]

$$\theta_{e\_hosei2} = \theta_{e\_hosei\_old} + \omega_e \Delta t \quad (20)$$

The correction signal calculation unit 31 determines the phase angle θβ in accordance with Equation (9) from the externally input current commands id*, iq*, and calculates the sine signal correction signal hsin and the cosine signal correction signal hcos in accordance with Equation (21), shown below, from the current vector, the phase angle θβ, and the second corrected electrical angle θe_hosei2

[Math. 21]

$$\begin{cases} h_{sin} = K_{sin} I_{rms} \sin(\theta_{e\_hosei2} + \theta_\beta + \delta_y) \\ h_{cos} = K_{cos} I_{rms} \sin(\theta_{e\_hosei2} + \theta_\beta + \delta_x) \end{cases} \quad (21)$$

Figure 7B:
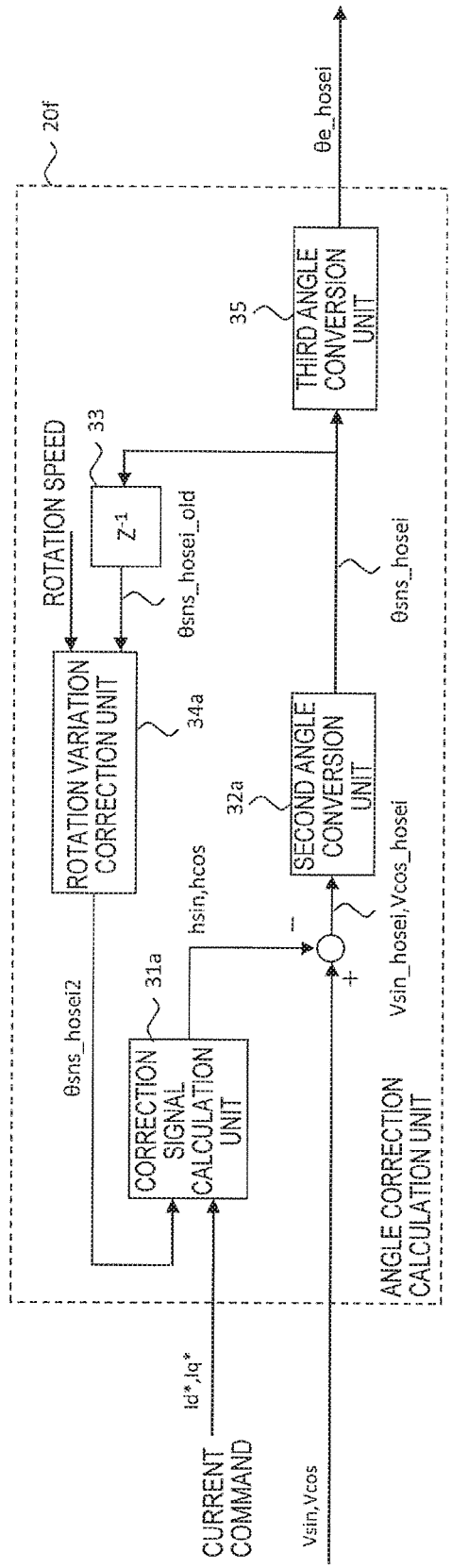
FIG. 7B is a second block diagram showing the angle correction calculation unit of the control device for an AC rotary machine according to the third embodiment of this invention.

In FIG. 7A, the second corrected electrical angle θe_hosei2 is used to calculate the sine signal correction signal hsin and the cosine signal correction signal hcos, but an angle correction calculation unit 20f such as that shown in FIG. 7B, which uses a second corrected detection angle θsns_hosei2, may be employed instead.

A rotation variation correction unit 34a corrects the previous value θsns_hosei_old of the corrected detection angle, which constitutes the angle information obtained by the previous value acquisition unit 33, as shown below in Equation (22) by adding thereto a product of a time Δt from calculation of the previous value of the corrected detection angle θsns_hosei to the current calculation and a temporal variation rate ωs of the detection angle θsns of the AC rotary machine 1, and outputs the result as the second corrected detection angle θsns_hosei2. Here, the angle variation amount is obtained from the product of the time Δt from calculation of the previous value to the current calculation and the temporal variation rate ωs of the detection angle θsns of the AC rotary machine 1, but as long as the amount of angle variation occurring between calculation of the previous value and the current calculation can be obtained, another method may be employed.

[Math. 22]

$$\theta_{sns\_hosei2} = \theta_{sns\_hosei\_old} + \omega_s \Delta t \quad (22)$$

The correction signal calculation unit 31 determines the phase angle θβ in accordance with Equation (9) from the externally input current commands id*, iq*, and calculates the sine signal correction signal hsin and the cosine signal correction signal hcos in accordance with Equation (23), shown below, from the current vector, the phase angle θβ, and the second corrected detection angle θsns_hosei2.

[Math. 23]

$$\begin{cases} h_{sin} = K_{sin} I_{rms} \sin\left(\dfrac{P}{P_{sns}} \theta_{sns\_hosei2} + \theta_\beta + \delta_y\right) \\ h_{cos} = K_{cos} I_{rms} \sin\left(\dfrac{P}{P_{sns}} \theta_{sns\_hosei2} + \theta_\beta + \delta_x\right) \end{cases} \quad (23)$$

Note that as the current vector used to calculate the sine signal correction signal hsin and the cosine signal correction signal hcos, either the current commands id*, iq* may be used, as shown in FIG. 7A, or the values of the three-phase alternating currents iu1, iv1, iw1 detected by the current detector 6 may be used.

Further, in the third embodiment, the sine signal correction signal hsin and the cosine signal correction signal hcos are both corrected, but in a case where the error in one of the signals is small or the like, similar effects can be obtained by correcting only one of the signals. Moreover, even when the errors in the two signals are identical, a smaller angle correction effect can be obtained by correcting either the sine signal correction signal hsin or the cosine signal correction signal hcos alone in consideration of the processing load or the like.

All other configurations and operations are identical to the first embodiment, and therefore description thereof has been omitted.

According to the third embodiment, as described above, an estimated angle value obtained by adding the angle variation amount from the previous calculation to the current calculation to either the previous value of the corrected detection angle θsns_hosei or the previous value of the corrected electrical angle θe_hosei is employed as the angle information used by the correction signal calculation unit, and therefore the angular position of the rotor can be detected with a high degree of precision even during high speed rotation, which is an effect not present in the prior art.

Fourth Embodiment

Figure 8A:
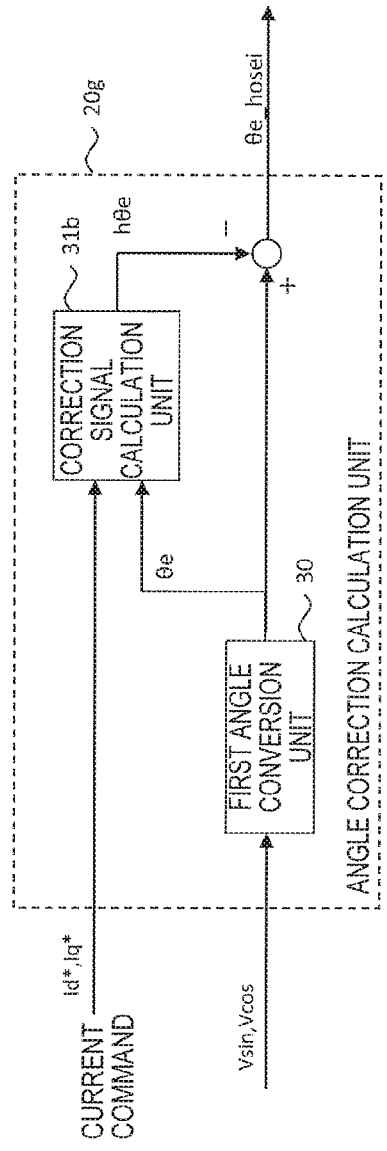
FIG. 8A is a first block diagram showing an angle correction calculation unit of a control device for an AC rotary machine according to a fourth embodiment of this invention.

FIG. 8A is a block diagram showing an angle correction calculation unit 20g of a control device for an AC rotary machine according to a fourth embodiment of this invention. The angle correction calculation unit 20g according to the fourth embodiment, shown in FIG. 8A, differs from that of the first embodiment, shown in FIG. 5A, in that a correction signal calculation unit 31b outputs hθe as a correction signal, and the electrical angle θe is corrected using hθe.

The correction signal calculation unit 31b determines the phase angle θβ in accordance with Equation (9) from the externally input current commands id*, iq*, and calculates an electrical angle correction signal hθe in accordance with Equation (24), shown below, from the current vector, the phase angle θβ, and the electrical angle θe.

[Math. 24]

$$h_{\theta e} = \frac{P}{P_{sns}} \left\{ \sqrt{\frac{e_{sin}^2 + e_{cos}^2}{4} + \frac{e_{sin}e_{cos}}{2}\sin(\delta_y - \delta_x)} \sin\left(\frac{P_{sns}+P}{P}\theta_e + \xi_1\right) + \right. \quad (24)$$

$$\left. \sqrt{\frac{e_{sin}^2 + e_{cos}^2}{4} - \frac{e_{sin}e_{cos}}{2}\sin(\delta_y - \delta_x)} \sin\left(\frac{P_{sns}-P}{P}\theta_e + \xi_2\right) \right\}$$

$$\begin{cases} E = \frac{1}{2}\{e_{sin}\cos(\theta_\beta + \delta_y) - e_{cos}\sin(\theta_\beta + \delta_x)\}, & F = \frac{1}{2}\{e_{sin}\sin(\theta_\beta + \delta_y) + e_{cos}\cos(\theta_\beta + \delta_x)\} \\ G = -\frac{1}{2}\{e_{sin}\cos(\theta_\beta + \delta_y) + e_{cos}\sin(\theta_\beta + \delta_x)\}, & H = \frac{1}{2}\{e_{sin}\sin(\theta_\beta + \delta_y) - e_{cos}\cos(\theta_\beta + \delta_x)\} \\ e_{sin} = -\frac{\sqrt{2}\sqrt{C^2+D^2}\mu_0 I_{rms}(\sin\theta_1 + \sin\theta_2)}{8\pi l_{y1} B_{base}}, \\ e_{cos} = -\frac{\sqrt{2}\sqrt{A^2+B^2}\mu_0 I_{rms}(\sin\theta_1 + \sin\theta_2)}{8\pi l_{y1} B_{base}} \\ \cos\xi_1 = \frac{E}{\sqrt{E^2+F^2}}, \sin\xi_1 = \frac{F}{\sqrt{E^2+F^2}}, \\ \cos\xi_2 = \frac{G}{\sqrt{G^2+H^2}}, \sin\xi_2 = \frac{H}{\sqrt{G^2+H^2}} \end{cases}$$

The corrected electrical angle θe_hosei is calculated by subtracting the electrical angle correction signal hθe from the electrical angle θe.

Here, the three-phase alternating current is represented only by the first order (fundamental period) component of the electrical angle θe, but even when a term including an $n^{th}$ order component (where n is a natural number not smaller than 2) of the electrical angle θe is included in Equation (10) (when Equation (10) is expressed as a Fourier series, for example), a formula corresponding to Equation (24) can be obtained by similar procedures due to the ability to superimpose the magnetic field.

More specifically, when the three-phase alternating current includes a higher order component of the electrical angle θe, a term relating to an $(n\pm P_{sns}/P)^{th}$ order sine wave (where n is a natural number not smaller than 2) having an amplitude value obtained by multiplying by the amplitude correction constant the absolute value of the current vector of the current commands id*, iq* or the detected currents id1, iq1 and a phase value obtained by adding the $(n\pm P_{sns}/P)^{th}$ order component of the electrical angle θe and the phase correction constant to the phase angle θβ relative to the q axis of the current vector of the current commands id*, iq* or the detected currents id1, iq1 is further included in the electrical angle correction signal hθe.

Figure 8B:
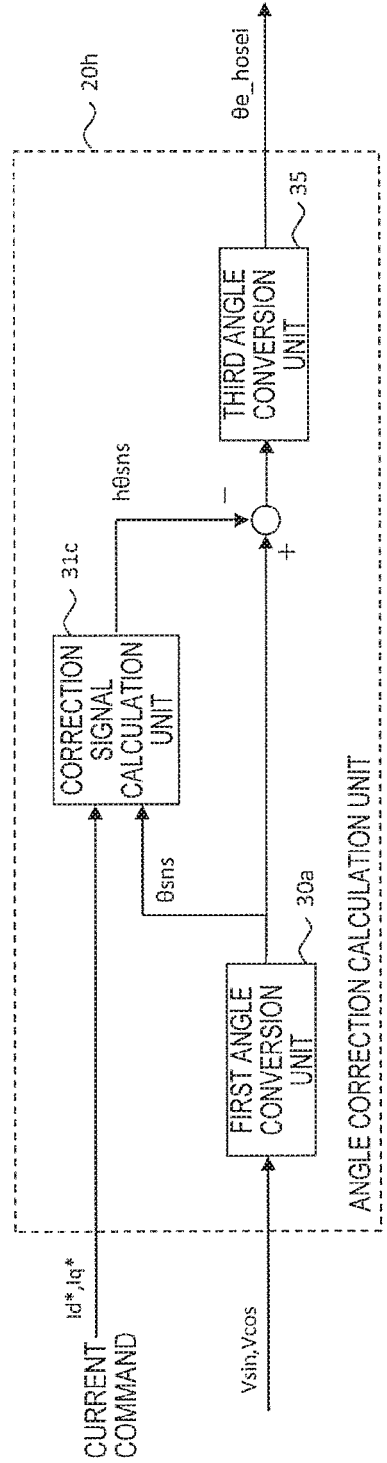
FIG. 8B is a second block diagram showing the angle correction calculation unit of the control device for an AC rotary machine according to the fourth embodiment of this invention.

In FIG. 8A, the electrical angle θe is used to calculate the electrical angle correction signal hθe, but an angle correction calculation unit 20h such as that shown in FIG. 8B, which uses the detection angle θsns as the angle information used by the correction signal calculation unit, may be employed instead. The angle correction calculation unit 20h shown in FIG. 8B differs from the angle correction calculation unit 20g shown in FIG. 8A with respect to the first angle conversion unit 30a, a correction signal calculation unit 31c, and the third angle conversion unit 35.

In FIG. 8B, the correction signal calculation unit 31c determines the phase angle θβ in accordance with Equation (9) from the externally input current commands id*, iq*, and calculates a detection angle correction signal hθsns in accordance with Equation (25), shown below, from the current vector, the phase angle θβ, and the detection angle θsns constituting the angle information obtained by the first angle conversion unit 30a.

[Math. 25]

$$h_{\theta sns} = \quad (25)$$

$$\frac{P}{P_{sns}} \left\{ \sqrt{\frac{e_{sin}^2 + e_{cos}^2}{4} + \frac{e_{sin}e_{cos}}{2}\sin(\delta_y - \delta_x)} \sin\left(\frac{P_{sns}+P}{P_{sns}}\theta_{sns} + \xi_1\right) + \right.$$

$$\left. \sqrt{\frac{e_{sin}^2 + e_{cos}^2}{4} - \frac{e_{sin}e_{cos}}{2}\sin(\delta_y - \delta_x)} \sin\left(\frac{P_{sns}-P}{P_{sns}}\theta_{sns} + \xi_2\right) \right\}$$

The corrected detection angle θsns_hosei is calculated by subtracting the detection angle correction signal hθsns from the detection angle θsns. The third angle conversion unit 35 calculates the corrected electrical angle θe_hosei in accordance with Equation (5) from the corrected detection angle θsns_hosei.

Figure 8C:
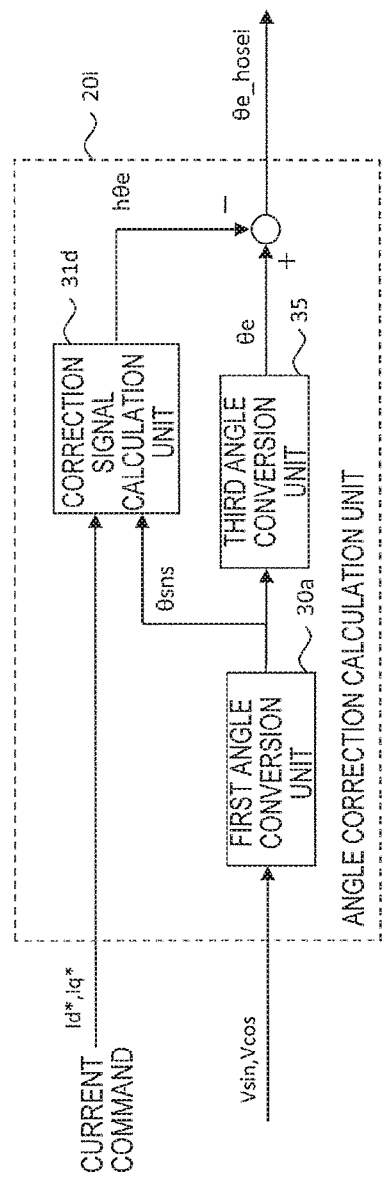
FIG. 8C is a third block diagram showing the angle correction calculation unit of the control device for an AC rotary machine according to the fourth embodiment of this invention.

Alternatively, an angle correction calculation unit 20i such as that shown in FIG. 8C may be used. The angle correction calculation unit 20i shown in FIG. 8C differs from the angle correction calculation unit 20g shown in FIG. 8A with respect to the first angle conversion unit 30a, a correction signal calculation unit 31d, and the third angle conversion unit 35.

In FIG. 8C, the correction signal calculation unit 31d determines the phase angle θβ in accordance with Equation (9) from the externally input current commands id*, iq*, and calculates the electrical angle correction signal hθe in accordance with Equation (26), shown below, from the current vector, the phase angle θβ, and the detection angle θsns constituting the angle information obtained by the first angle conversion unit 30a.

[Math. 26]

$$h_{\theta e} = \quad (26)$$

$$\frac{P}{P_{sns}} \left\{ \sqrt{\frac{e_{sin}^2 + e_{cos}^2}{4} + \frac{e_{sin}e_{cos}}{2}\sin(\delta_y - \delta_x)} \sin\left(\frac{P_{sns}+P}{P_{sns}}\theta_{sns} + \xi_1\right) + \right.$$

$$\left. \sqrt{\frac{e_{sin}^2 + e_{cos}^2}{4} - \frac{e_{sin}e_{cos}}{2}\sin(\delta_y - \delta_x)} \sin\left(\frac{P_{sns}-P}{P_{sns}}\theta_{sns} + \xi_2\right) \right\}$$

The third angle conversion unit 35 calculates the electrical angle θe in accordance with Equation (5) from the detection angle θsns. The corrected electrical angle θe_hosei is calculated by subtracting the electrical angle correction signal hθe from the electrical angle θe.

Note that FIG. 8A, FIG. 8B, and FIG. 8C show example configurations of the angle correction calculation unit, and as long as the angle information that is input into the correction signal calculation unit can be obtained by multiplying the angles obtained from the sine signal Vsin and the cosine signal Vcos by a constant, the angle information may be used by the correction signal calculation unit as a correction signal. Needless to mention, when the initial phases of the detection angle θsns and the electrical angle θe deviate from each other, the detection angle θsns and the electrical angle θe cannot simply be multiplied by a constant, and instead, an offset component thereof must be adjusted.

Note that as the current vector used to calculate the detection angle correction signal hθsns or the electrical angle correction signal hθe, either the current commands id*, iq* may be used, as shown in FIG. 8A, or the values of the three-phase alternating currents iu1, iv1, iw1 detected by the current detector 6 may be used.

All other configurations and operations are identical to the first embodiment, and therefore description thereof has been omitted.

According to the fourth embodiment, as described above, by having the correction signal calculation unit calculate either the detection angle correction signal hθsns or the electrical angle correction signal hθe, the angle error can be corrected using a smaller number of correction signals and without using the fundamental wave amplitudes of the sine signal Vsin and the cosine signal Vcos, which is an effect not present in the prior art.

Fifth Embodiment

Figure 9A:
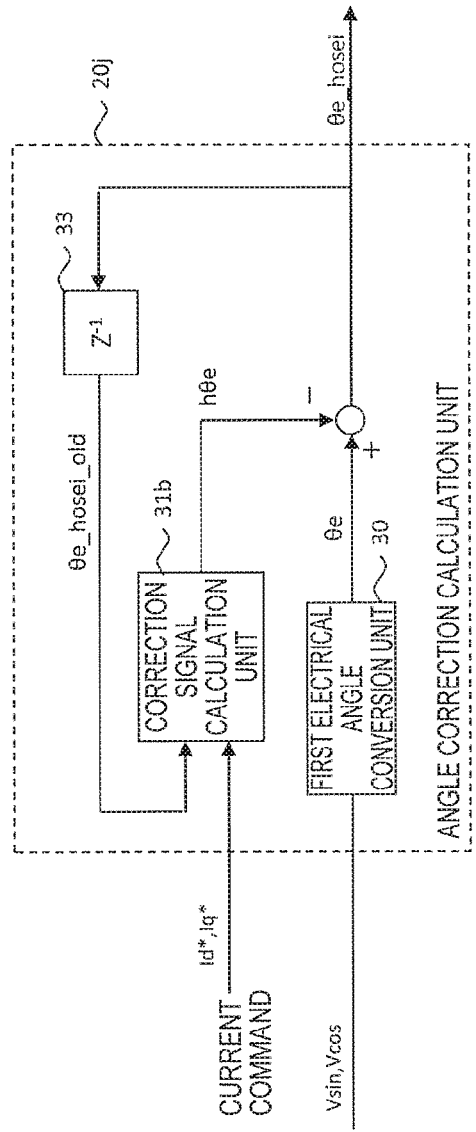
FIG. 9A is a first block diagram showing an angle correction calculation unit of a control device for an AC rotary machine according to a fifth embodiment of this invention.

FIG. 9A is a block diagram showing an angle correction calculation unit 20j of a control device for an AC rotary machine according to a fifth embodiment of this invention. The angle correction calculation unit 20j according to the fifth embodiment, shown in FIG. 9A, differs from that of the fourth embodiment, shown in FIG. 8A, in that the previous value θe_hosei_old of the corrected electrical angle θe_hosei is input into the correction signal calculation unit 31b instead of the electrical angle θe.

The correction signal calculation unit 31b determines the phase angle θβ in accordance with Equation (9) from the externally input current commands id*, iq*, and calculates the electrical angle correction signal hθe in accordance with Equation (24) from the current vector, the phase angle θβ, and the previous value θe_hosei_old of the corrected electrical angle.

Figure 9B:
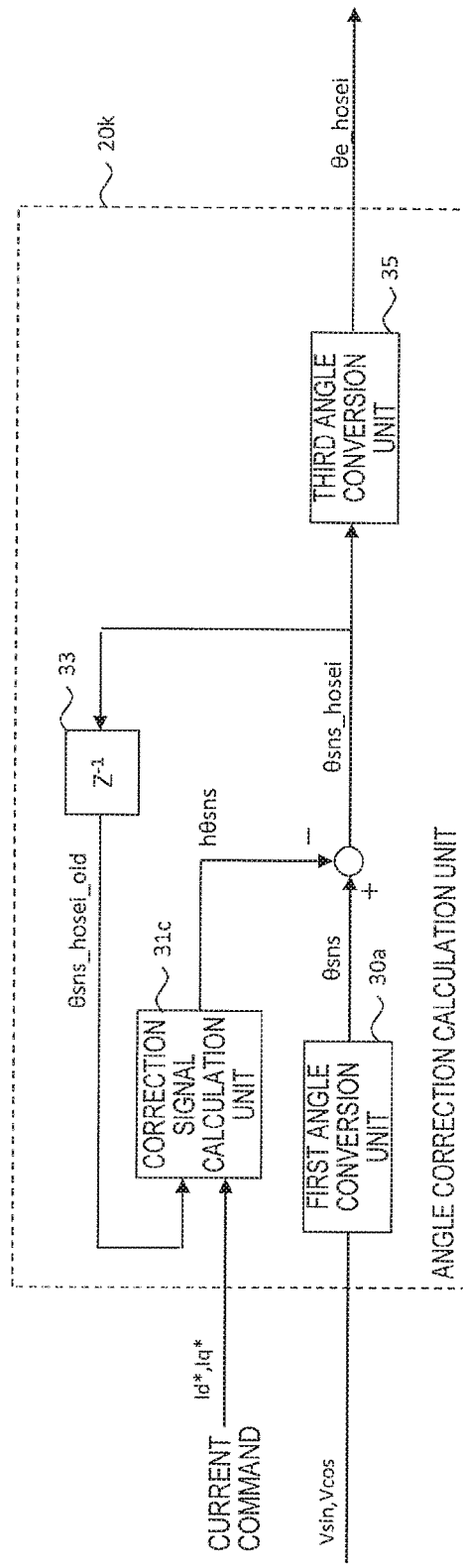
FIG. 9B is a second block diagram showing the angle correction calculation unit of the control device for an AC rotary machine according to the fifth embodiment of this invention.

In FIG. 9A, the electrical angle θe is used to calculate the electrical angle correction signal hθe, but an angle correction calculation unit 20k such as that shown in FIG. 9B, which uses the detection angle θsns as the angle information used by the correction signal calculation unit, may be employed instead. The angle correction calculation unit 20k shown in FIG. 9B differs from the angle correction calculation unit 20j shown in FIG. 9A with respect to the correction signal calculation unit 31c, the first angle conversion unit 30a, and the third angle conversion unit 35.

In FIG. 9B, the correction signal calculation unit 31c determines the phase angle θβ in accordance with Equation (9) from the externally input current commands id*, iq*, and calculates the detection angle correction signal hθsns in accordance with Equation (25) from the current vector, the phase angle θβ, and the previous value θsns_hosei_old of the corrected detection angle, which constitutes the angle information obtained by the previous value acquisition unit 33.

The third angle conversion unit 35 calculates the corrected electrical angle θe_hosei in accordance with Equation (26) from the corrected detection angle θsns_hosei.

Similar effects to those of the configuration shown in FIG. 9A can be obtained with the configuration shown in FIG. 9B. Note that FIG. 9A and FIG. 9B show example configurations of the angle correction calculation unit, and as long as the angle information that is input into the correction signal calculation unit can be obtained by multiplying the angles obtained from the sine signal Vsin and the cosine signal Vcos by a constant, the angle information may be used by the correction signal calculation unit as a correction signal.

Needless to mention, when the initial phases of the detection angle θsns and the electrical angle θe deviate from each other, the detection angle θsns and the electrical angle θe cannot simply be multiplied by a constant, and instead, an offset component thereof must be adjusted.

Note that as the current vector used to calculate the sine signal correction signal hsin and the cosine signal correction signal hcos, either the current commands id*, iq* may be used, as shown in FIG. 9A, or the values of the three-phase alternating currents iu1, iv1, iw1 detected by the current detector 6 may be used.

All other configurations and operations are identical to the first embodiment, and therefore description thereof has been omitted.

According to the fifth embodiment, as described above, the previous value of either the corrected detection angle θsns_hosei or the corrected electrical angle θe_hosei is employed instead of the detection angle θsns or the electrical angle θe as the angle information used by the correction signal calculation unit, and therefore the angle correction calculation unit can generate the correction signals on the basis of signals having a small angle error. As a result, the correction signals can be generated with a high degree of precision, which is an effect not present in the prior art.

Moreover, by calculating either the detection angle correction signal hθsns or the electrical angle correction signal hθe, the angle error can be corrected using a smaller number of correction signals and without using the fundamental wave amplitudes of the sine signal Vsin and the cosine signal Vcos, which is an effect not present in the prior art.

Sixth Embodiment

Figure 10A:
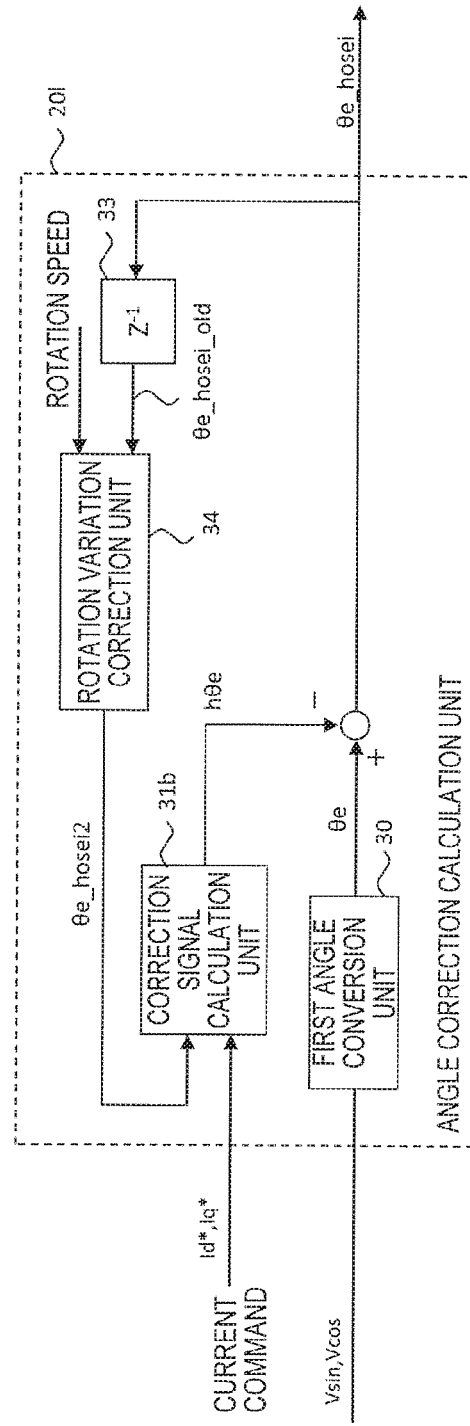
FIG. 10A is a first block diagram showing an angle correction calculation unit of a control device for an AC rotary machine according to a sixth embodiment of this invention.

FIG. 10A is a block diagram showing an angle correction calculation unit 20l of a control device for an AC rotary machine according to a sixth embodiment of this invention. The angle correction calculation unit 20l according to the sixth embodiment, shown in FIG. 10A, differs from that of the fifth embodiment, shown in FIG. 9A, in that the rotation variation correction unit 34 is provided to correct the previous calculation value of the corrected electrical angle θe_hosei on the basis of the temporal variation rate ωe of the electrical angle θe of the AC rotary machine 1.

The method employed by the rotation variation correction unit 34 to calculate the second corrected electrical angle θe_hosei2 was described above in the third embodiment, and therefore further description thereof has been omitted.

The correction signal calculation unit 31b determines the phase angle θβ in accordance with Equation (9) from the externally input current commands id*, iq*, and calculates the electrical angle correction signal hθe in accordance with Equation (24) from the current vector, the phase angle θβ, and the second corrected electrical angle θe_hosei2.

The corrected electrical angle θe_hosei is calculated by subtracting the electrical angle correction signal hθe from the electrical angle θe.

Figure 10B:
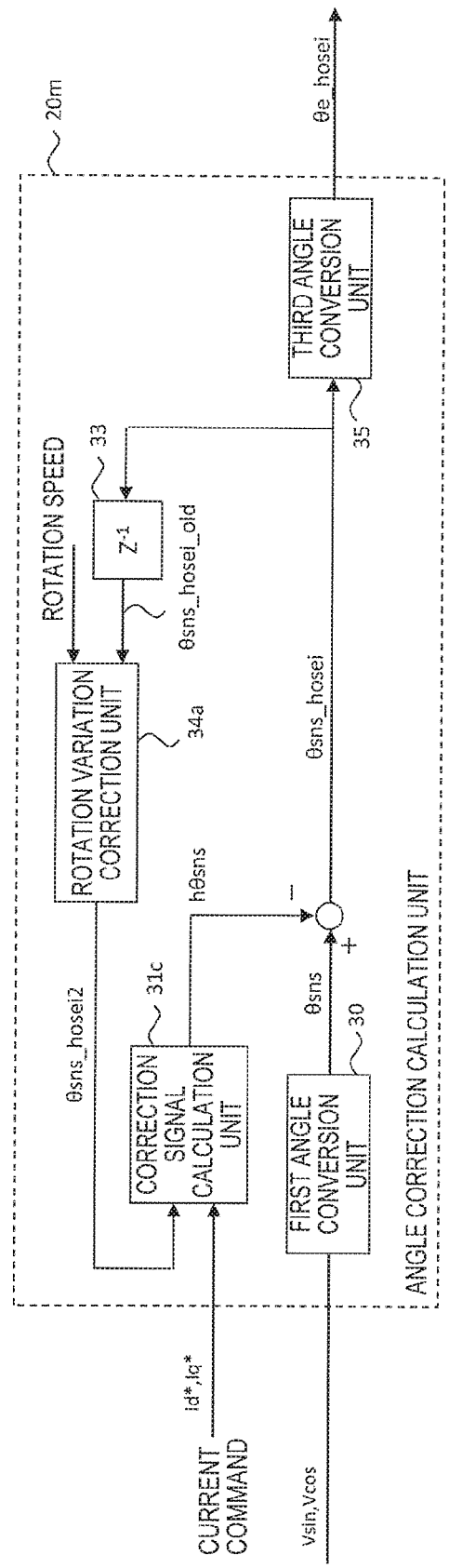
FIG. 10B is a second block diagram showing the angle correction calculation unit of the control device for an AC rotary machine according to the sixth embodiment of this invention.

In FIG. 10A, the second corrected electrical angle θe_hosei2 is used to calculate the electrical angle correction signal hθe, but an angle correction calculation unit 20m such as that shown in FIG. 10B, which uses the second corrected detection angle θsns_hosei2, may be employed instead.

The correction signal calculation unit 31c determines the phase angle θβ in accordance with Equation (9) from the externally input current commands id*, iq*, and calculates the detection angle correction signal hθsns in accordance with Equation (25) from the current vector, the phase angle θβ, and the second corrected detection angle θsns_hosei2.

The third angle conversion unit 35 calculates the corrected electrical angle θe_hosei in accordance with Equation (26) from the corrected detection angle θsns_hosei.

Similar effects to those of the configuration shown in FIG. 10A can be obtained with the configuration shown in FIG. 10B. Note that FIG. 10A and FIG. 10B show example configurations of the angle correction calculation unit, and as long as the angle information that is input into the correction signal calculation unit can be obtained by multiplying the angles obtained from the sine signal Vsin and the cosine signal Vcos by a constant, the angle information may be used by the correction signal calculation unit as a correction signal. Needless to mention, when the initial phases of the detection angle θsns and the electrical angle θe deviate from each other, the detection angle θsns and the electrical angle θe cannot simply be multiplied by a constant, and instead, an offset component thereof must be adjusted.

Note that as the current vector used to calculate the detection angle correction signal hθsns or the electrical angle correction signal hθe, either the current commands id*, iq* may be used, as shown in FIG. 10A, or the values of the three-phase alternating currents iu1, iv1, iw1 detected by the current detector 6 may be used.

All other configurations and operations are identical to the first embodiment, and therefore description thereof has been omitted.

According to the sixth embodiment, as described above, an estimated angle value obtained by adding the angle variation amount from the previous calculation to the current calculation to either the previous value of the corrected detection angle θsns_hosei or the previous value of the corrected electrical angle θe_hosei is employed as the angle information used by the correction signal calculation unit, and therefore the angular position of the rotor can be detected with a high degree of precision even during high speed rotation.

Moreover, by calculating either the detection angle correction signal hθsns or the electrical angle correction signal hθe, the angle error can be corrected using a smaller number of correction signals and without using the fundamental wave amplitudes of the sine signal Vsin and the cosine signal Vcos, which is an effect not present in the prior art.

Seventh Embodiment

In the first to sixth embodiments, cases in which a single set of armature windings is provided were described, whereas in an seventh embodiment, a case in which a plurality of sets of armature windings are provided will be described. Further, a case in which the magnetic field generator 3 generates a strong angle detecting magnetic field such that the angle detector 4 is used in a saturation sensitivity region will be described.

Figure 11:
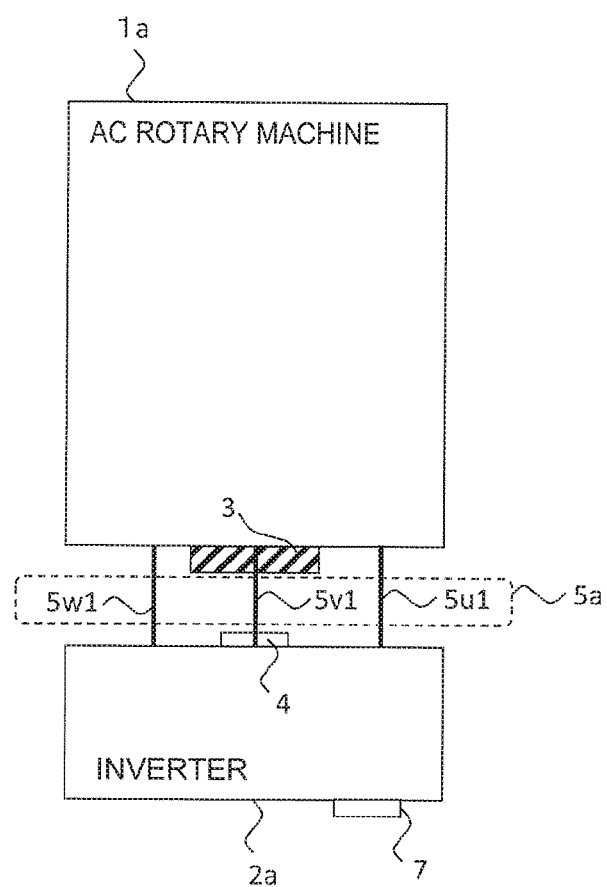
FIG. 11 is a schematic view showing a configuration of a control device for an AC rotary machine according to a seventh embodiment of this invention together with an AC rotary machine.

FIG. 11 is a pattern diagram showing an arrangement of the seventh embodiment. An AC rotary machine 1a is a permanent magnetic type synchronous rotary machine having first armature windings U1, V1, W1 and second armature windings U2, V2, W2. The AC rotary machine 1a is configured to include a rotor and a stator, and the rotor is rotated by a rotating magnetic field formed by a three-phase alternating current passed through the armature windings of the stator.

Here, a permanent magnet type synchronous rotary machine will be described, but a field winding type synchronous rotary machine may be used instead. Three-phase windings will be described here, but an AC rotary machine having windings of more than three phases may be used instead. Further, an AC rotary machine having two sets of windings will be described here, but an AC rotary machine having three or more sets of windings may be used instead.

Currents flowing respectively through the first armature windings and the second armature windings have a 30 degree phase difference. By providing a 30 degree phase difference, a torque ripple of the electrical angle sixth order can be canceled out in a case where two sets of armature windings are provided.

An inverter 2a is constituted by a first inverter 2a1 for supplying power to the first armature windings and a second inverter 2a2 for supplying power to the second armature windings. The inverter 2a implements power conversion on a DC voltage input therein from the DC power supply by switching semiconductor switches ON and OFF on the basis of switching signals, and applies voltages to the armature windings of the AC rotary machine 1a via an inverter connection unit 5a.

The AC rotary machine 1a and the inverter 2a are connected to each other by the inverter connection unit 5a. The inverter connection unit 5a is constituted by a first inverter connection unit 5a1 and a second inverter connection unit 5a2.

The first inverter connection unit 5a1 is constituted by an inverter connection unit 5u1, an inverter connection unit 5v1, and an inverter connection unit 5w1 that pass a U phase current, a V phase current, and a W phase current, respectively, through the first armature windings, while the second inverter connection unit 5a2 is constituted by an inverter connection unit 5u2, an inverter connection unit 5v2, and an inverter connection unit 5w2 that pass a U phase current, a V phase current, and a W phase current, respectively, through the second armature windings. Note that to prevent FIG. 11 from becoming difficult to understand, the inverter connection units 5u2, 5v2, and 5w2 have been omitted therefrom.

A voltage applied by the first inverter 2a1 is applied to the first armature windings of the AC rotary machine 1a through the first inverter connection unit 5a1, and a voltage applied by the second inverter 2a2 is applied to the second armature windings of the AC rotary machine 1a through the second inverter connection unit 5a2. Hence, a desired current flows through the AC rotary machine 1a, and as a result, torque is generated.

A first current detector 6a1 is provided between a lower arm of each phase of the first inverter 2a1 and the ground of the DC power supply 8 in order to detect the three-phase alternating currents iu1, iv1, iw1 flowing through the respective phases of the first inverter connection unit 5a1. Note that instead of detecting all three phases of the three-phase alternating current, it is possible to detect only two phases and obtain the remaining phase by calculation, using the fact that the vector sum of the three-phase alternating current is 0.

The first current detector 6a1 may also be provided between an upper arm of each phase of the first inverter 2a1 and the positive electrode side of the DC power supply 8. Moreover, the first current detector 6a1 may calculate the three-phase alternating current using a method of detecting a bus current value by shifting a switching timing of the first inverter 2a1 in order to secure a current detection time.

A second current detector 6a2 is provided between a lower arm of each phase of the second inverter 2a2 and the ground of the DC power supply 8 in order to detect three-phase alternating currents iu2, iv2, iw2 flowing through the respective phases of the second inverter connection unit 5a2.

Note that instead of detecting all three phases of the three-phase alternating current, it is possible to detect only two phases and obtain the remaining phase by calculation, using the fact that the vector sum of the three-phase alternating current is zero.

The second current detector 6a2 may also be provided between an upper arm of each phase of the second inverter 2a2 and the positive electrode side of the DC power supply 8. Moreover, the second current detector 6a2 may calculate the three-phase alternating current using a method of detecting a bus current value by shifting a switching timing of the second inverter 2a2 in order to secure a current detection time.

A control calculation unit 7a is configured to include the angle correction calculation unit 20 and a current control unit 21a.

The angle correction calculation unit 20 corrects errors in the sine signal Vsin and the cosine signal Vcos caused by noise magnetic fields generated by the three-phase alternating currents flowing through the inverter connection units 5, and outputs the result as the corrected electrical angle θe_hosei.

Note that the current vector used to calculate the noise magnetic field may be obtained from the current commands id*, iq*, the three-phase alternating currents iu1, iv1, iw1 detected by the first current detector 6a1, or the three-phase alternating currents iu2, iv2, iw2 detected by the second current detector 6a2. Needless to mention, the current vector may also be obtained using values that have been passed through a low pass filter or the like in order to remove noise therefrom.

First, the current control unit 21a uses the corrected electrical angle θe_hosei to convert the three-phase alternating currents iu1, iv1, iw1 flowing through the first inverter connection unit 5a1 into first detected currents id1, iq1 on a rotating coordinate system. The current control unit 21a then calculates first voltage commands Vu1, Vv1, Vw1 by feedback control so that the externally input current commands id*, iq* equal the first detected currents id1, iq1.

Next, the current control unit 21a outputs switching signals Qup1 to Qwn1 to the first inverter 2a1 by means of pulse width modulation (PWM modulation) corresponding to the first voltage commands Vu1, Vv1, Vw1, and then converts the three-phase alternating currents iu2, iv2, iw2 flowing through the second inverter connection unit 5a2 into second detected currents id2, iq2 on a rotating coordinate system. The current control unit 21a then calculates second voltage commands Vu2, Vv2, Vw2 by feedback control so that the current commands id*, iq* equal the second detected currents id2, iq2.

Finally, the current control unit 21a outputs switching signals Qup2 to Qwn2 to the second inverter 2a2 by means of pulse width modulation (PWM modulation) corresponding to the second voltage commands Vu2, Vv2, Vw2.

Note that the feedback control implemented on the three-phase alternating currents iu1, iv1, iw1 and the three-phase alternating currents iu2, iv2, iw2 may be replaced with appropriate feedforward control for the AC rotary machine 1a, and in this case, the first current detector 6a1, the values of the three-phase alternating currents iu1, iv1, iw1 detected by the first current detector 6a1, the second current detector 6a2, and the values of the three-phase alternating currents iu2, iv2, iw2 detected by the second current detector 6a2 are no longer required.

The magnetic field generator 3 and the angle detector 4 are identical to the first embodiment, and therefore description thereof has been omitted.

Figure 12:
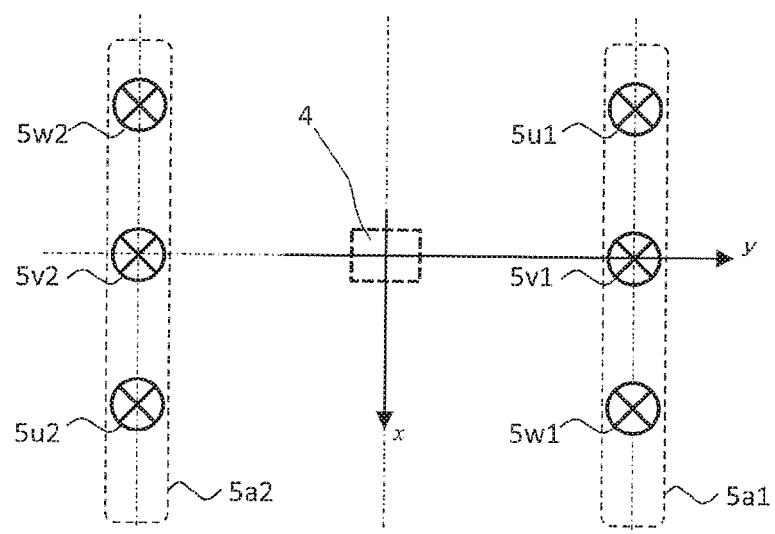
FIG. 12 is a sectional view and a side view showing a relative positional relationship between an angle detector and an inverter connection unit of a control device for an AC rotary machine according to an eighth embodiment of this invention.

FIG. 12 is a sectional view showing a positional relationship between the angle detector 4 and the inverter connection unit 5a. The first inverter connection unit 5a1 and the second inverter connection unit 5a2 are disposed such that corresponding phases thereof respectively exhibit point symmetry relative to the angle detector 4.

The inverter connection unit 5a according to the seventh embodiment, shown in FIG. 12, differs from the inverter connection unit 5 according to the first embodiment, shown in FIG. 2, mainly in being constituted by the first inverter connection unit 5a1, which is disposed on the positive direction side (the right side) of the y axis, and the second inverter connection unit 5a2, which is disposed on the negative direction side (the left side) of the y axis.

The three-phase alternating currents flowing through the inverter connection unit 5a are expressed as shown below in Equation (27). Here, √2×Irms denotes the amplitudes of the three-phase alternating currents.

[Math. 27]

$$\begin{cases} I_{u1} = \sqrt{2}\,I_{rms}\sin(\theta_e + \theta_\beta - \pi) \\ I_{v1} = \sqrt{2}\,I_{rms}\sin\left(\theta_e + \theta_\beta + \frac{\pi}{3}\right) \\ I_{w1} = \sqrt{2}\,I_{rms}\sin\left(\theta_e + \theta_\beta - \frac{\pi}{3}\right) \\ I_{u2} = \sqrt{2}\,I_{rms}\sin\left(\theta_e + \theta_\beta + \frac{5}{6}\pi\right) \\ I_{v2} = \sqrt{2}\,I_{rms}\sin\left(\theta_e + \theta_\beta + \frac{\pi}{6}\right) \\ I_{w2} = \sqrt{2}\,I_{rms}\sin\left(\theta_e + \theta_\beta - \frac{\pi}{2}\right) \end{cases} \quad (27)$$

Note that for simplicity, the three-phase alternating currents are set as sine waves in Equation (27), and only the first order (fundamental period) component of the electrical angle θe is shown. However, when a higher order component of the electrical angle θe is included, such as in the case of trapezoidal wave driving, for example, a term including an $n^{th}$ order component (where n is a natural number not smaller than 2) of the electrical angle θe should be added to Equation (27) (for example, Equation (27) should be expressed as a Fourier series).

At this time, the noise magnetic field Bi generated by the two sets of three-phase alternating currents flowing through the inverter connection unit 5a in the position of the angle detector 4 is as expressed below in Equation (28).

[Math. 28]

$$\begin{cases} B_{i\_x} = \frac{\mu_0 I_{rms}}{4\pi l_{y1}}(\sin\theta_1 + \sin\theta_2)\left(\cos 2\theta_{u1} + \right. \\ \left. \sqrt{2}\sin\frac{\pi}{12}\cos 2\theta_{v1} - \sqrt{2}\cos\frac{\pi}{12}\cos 2\theta_{w1}\right)\sin\left(\theta_e + \theta_\beta - \frac{\pi}{4}\right) \\ B_{i\_y} = \frac{\mu_0 I_{rms}}{4\pi l_{y1}}(\sin\theta_1 + \sin\theta_2)\left(\sin 2\theta_{u1} - \right. \\ \left. \sqrt{2}\cos\frac{\pi}{12}\sin 2\theta_{v1} + \sqrt{2}\sin\frac{\pi}{12}\sin 2\theta_{w1}\right)\sin\left(\theta_e + \theta_\beta + \frac{\pi}{4}\right) \end{cases} \quad (28)$$

In the first embodiment, the relationship between the detection angle θsns and the electrical angle θe is defined by Equation (5), but when the detection angle and the electrical angle increase in opposite directions, the relationship between the detection angle θsns and the electrical angle θe is expressed as shown below in Equation (29). Here, to illustrate a case in which the initial phases of the detection angle θsns and the electrical angle θe are different, the detection angle θsns and the electrical angle θe are offset by an initial phase difference θofs.

[Math. 29]

$$\theta_e = -\frac{P}{P_{sns}}\theta_{sns} - \theta_{ofs} \tag{29}$$

Equation (30), shown below, is obtained from Equations (28) and (29).

[Math. 30]

$$\begin{cases} B_{i\_x} = K_x I_{rms} \sin\left(4\theta_{sns} + \theta_{ofs} - \theta_\beta - \frac{3}{4}\pi\right) \\ B_{i\_y} = K_y I_{rms} \left(4\theta_{sns} + \theta_{ofs} - \theta_\beta + \frac{3}{4}\pi\right) \end{cases} \tag{30}$$

Next, a case in which the magnetic field generator 3 generates a strong angle detecting magnetic field such that the angle detector 4 is used in the saturation sensitivity region will be described. When the magnetic field generated by the magnetic field generator 3 in the position of the angle detector 4 is set to be strong enough to enter the saturation sensitivity region of the angle detector 4 in order to secure stability during use of the angle detector 4, it is impossible to detect all of the noise magnetic fields Bi of Equation (30) as angles, and therefore a saturated component in an identical direction to a main component vector of the magnetic field generated by the magnetic field generator 3 is not detected. In other words, a normal direction vector relative to the main component vector of the magnetic field generated by the magnetic field generator 3 is considered to be the component indicating the angle error.

By converting Equation (12) to vector notation, a main component vector B of the magnetic field generated by the magnetic field generator 3 is expressed as shown below in Equation (31).

[Math. 31]

$$\vec{B}_{base} = \begin{pmatrix} B_{base\_x} \\ B_{base\_y} \end{pmatrix} \tag{31}$$

A unit vector t of the normal direction of the main component vector B is expressed by Equation (32), shown below.

[Math. 32]

$$\vec{t} = \begin{pmatrix} -\sin\theta_{sns} \\ \cos\theta_{sns} \end{pmatrix} \tag{32}$$

When the noise magnetic field Bi is expressed in vector notation, Equation (33), shown below, is obtained.

[Math. 33]

$$\vec{B}_i = \begin{pmatrix} B_{i\_x} \\ B_{i\_y} \end{pmatrix} \tag{33}$$

From Equations (31), (27), and (28), a vector Bsns of the noise magnetic field detected as the angle error is obtained by projecting the noise magnetic field vector Bi onto the normal vector t, and can therefore be expressed as shown below in Equation (34).

[Math. 34]

$$\vec{B}_{sns} = I_{rms} \begin{pmatrix} \frac{K_x + K_y}{4}\sin(2\theta_{sns} + \theta_\gamma - \frac{\pi}{2}) + \frac{K_x}{2}\sin(4\theta_{sns} + \theta_\gamma + \frac{\pi}{2}) + \\ \frac{K_x - K_y}{4}\sin(6\theta_{sns} + \theta_\gamma - \frac{\pi}{2}) \\ \frac{K_x + K_y}{4}\sin(2\theta_{sns} + \theta_\gamma) + \frac{K_y}{2}\sin(4\theta_{sns} + \theta_\gamma) + \\ \frac{K_x - K_y}{4}\sin(6\theta_{sns} + \theta_\gamma + \pi) \end{pmatrix} \tag{34}$$

$$\left(\theta_\gamma = \theta_{ofs} - \theta_\beta + \frac{3}{4}\pi\right)$$

Hence, when the magnetic field generator 3 generates a strong angle detecting magnetic field such that the angle detector 4 is used in the saturation sensitivity region, a noise component esin and a noise component ecos that are superimposed onto the sine signal and the cosine signal, respectively, due to the noise magnetic field are expressed as shown below in Equation (35). In other words, a sine wave of a $(1\pm 2Psns/P)^{th}$ order component of the electrical angle is further superimposed onto the first embodiment, which is represented by the sine wave of the first order component of the electrical angle.

[Math. 35]

$$\begin{cases} e_{sin} = \frac{A_{sin}I_{rms}}{B_{base}}\left\{\frac{K_x + K_y}{4}\sin(2\theta_{sns} + \theta_\gamma) + \right. \\ \left. \frac{K_y}{2}\sin(4\theta_{sns} + \theta_\gamma) + \frac{K_x - K_y}{4}\sin(6\theta_{sns} + \theta_\gamma + \pi)\right\} \\ e_{cos} = \frac{A_{cos}I_{rms}}{B_{base}}\left\{\frac{K_x + K_y}{4}\sin(2\theta_{sns} + \theta_\gamma - \frac{\pi}{2}) + \right. \\ \left. \frac{K_x}{2}\sin(4\theta_{sns} + \theta_\gamma + \frac{\pi}{2}) + \frac{K_x - K_y}{4}\sin(6\theta_{sns} + \theta_\gamma - \frac{\pi}{2})\right\} \end{cases} \tag{35}$$

Hence, by setting the sine signal correction signal hsin and the cosine signal correction signal hcos as esin and ecos, respectively, and configuring the angle correction calculation unit 20 similarly to the first to third embodiments, a detection error in the angle detector caused by the noise magnetic field generated by the multi-phase alternating current flowing through the inverter connection unit can be corrected using a correction signal having a phase and an amplitude that are determined in accordance with the relative positional relationship between the inverter connection unit and the angle detector and the value of the multi-phase alternating current. As a result, it is possible to obtain a simple, low-cost control device for an AC rotary machine with which the angular position of the rotor can be detected with a high degree of precision.

Here, the three-phase alternating current is represented only by the first order (fundamental period) component of the electrical angle θe, but even when a term including an n$^{th}$ order component (where n is a natural number not smaller than 2) of the electrical angle θe is included in Equation (27) (when Equation (27) is expressed as a Fourier series, for example), a formula corresponding to Equation (35) can be obtained by similar procedures due to the ability to superimpose the magnetic field.

More specifically, when the three-phase alternating current includes a higher order component of the electrical angle θe, a term relating to an (n±2Psns/P)$^{th}$ order sine wave (where n is a natural number not smaller than 2) having an amplitude value obtained by multiplying by the amplitude correction constant the absolute value of the current vector of the current commands id*, iq* or the detected currents id1, iq1 and a phase value obtained by adding the (n±2Psns/P)$^{th}$ order component of the electrical angle θe and the phase correction constant to the phase angle θβ relative to the q axis of the current vector of the current commands id*, iq* or the detected currents id1, iq1 is further included in the sine signal correction signal hsin and the cosine signal correction signal hcos in the first embodiment.

Note that as the current vector used to calculate the sine signal correction signal hsin and the cosine signal correction signal hcos, the current commands id*, iq*, the values of the three-phase alternating currents iu1, iv1, iw1 detected by the first current detector 6a1, or the values of the three-phase alternating currents iu2, iv2, iw2 detected by the second current detector 6a2 may be used.

Further, an angle error εsns occurring in the detection angle θsns is expressed by Equation (36), shown below. In other words, the angle error εsns is similar to that of the first embodiment, which is expressed by the sine wave of the (1±2Psns/P)$^{th}$ order component of the electrical angle.

[Math. 36]

$$\varepsilon_{sns} \approx \frac{I_{rms}}{2B_{base}}\{(K_x + K_y)\sin(3\theta_{sns} + \theta_y) - (K_x - K_y)\sin(5\theta_{sns} + \theta_y)\} \quad (36)$$

More specifically, by setting the detection signal correction signal hθsns as εsns and configuring the angle correction calculation unit 20 similarly to the fourth to sixth embodiments, a detection error in the angle detector caused by the noise magnetic field generated by the multi-phase alternating current flowing through the inverter connection unit can be corrected using a correction signal having a phase and an amplitude that are determined in accordance with the relative positional relationship between the inverter connection unit and the angle detector and the value of the multi-phase alternating current. As a result, the angle error can be corrected using a smaller number of correction signals and without using the fundamental wave amplitudes of the sine signal Vsin and the cosine signal Vcos, which is an effect not present in the prior art.

Here, the three-phase alternating current is represented only by the first order (fundamental period) component of the electrical angle θe, but even when a term including an n$^{th}$ order component (where n is a natural number not smaller than 2) of the electrical angle θe is included in Equation (27) (when Equation (27) is expressed as a Fourier series, for example), a formula corresponding to Equation (36) can be obtained by similar procedures due to the ability to superimpose the magnetic field.

More specifically, when the three-phase alternating current includes a higher order component of the electrical angle θe, a term relating to the (n±2Psns/P)$^{th}$ order sine wave (where n is a natural number not smaller than 2), which has an amplitude value obtained by multiplying by the amplitude correction constant the absolute value of the current vector of the current commands id*, iq* or the detected currents id1, iq1 and a phase value obtained by adding the (n±2Psns/P)$^{th}$ order component of the electrical angle θe and the phase correction constant to the phase angle θβ relative to the q axis of the current vector of the current commands id*, iq* or the detected currents id1, iq1 is further included in the electrical angle correction signal hθe.

Note that a case in which the AC rotary machine 1a includes two sets of three-phase armature windings was described above, but similar effects are obtained with an AC rotary machine having a plurality of multi-phase armature windings other than two.

Eighth Embodiment

In the seventh embodiment, a 30 degree phase difference is provided between the currents flowing through the first armature windings and the second armature windings. In an eighth embodiment, in contrast to the seventh embodiment, the currents flowing through the first armature windings and the second armature windings have identical phases. All other configurations are identical to the seventh embodiment, and therefore description thereof has been omitted.

FIG. 12 is a sectional view and a side view showing a relative positional relationship between an angle detector and an inverter connection unit of a control device for an AC rotary machine according to an eighth embodiment of this invention. As shown in FIG. 12, the first inverter connection unit 5a1 and the second inverter connection unit 5a2 are disposed such that the corresponding phases thereof respectively exhibit point symmetry relative to the angle detector 4.

In the eighth embodiment, in which the currents flowing through the first armature windings and the second armature windings have identical phases, the magnetic fields generated by the inverter connection units 5u1, 5v1, 5w1 and the magnetic fields generated by the inverter connection units 5u2, 5v2, 5w2 cancel each other out, and as a result, the error generated in the signal obtained by the angle detector 4 is zero.

A case in which a fault occurs in the second armature windings, the second inverter 2a2, or the second inverter connection unit 5a2 will now be described.

First, when the power supply to the second armature windings is stopped, the noise magnetic field generated in the position of the angle detector 4 takes a value of zero in terms of the component thereof that is generated by the current flowing through the second inverter connection unit 5a2, and therefore only the component that is generated by the current flowing through the first inverter connection unit 5a1 remains.

In other words, in this case, similar effects are obtained by implementing correction using the correction signals described in the first to seventh embodiments.

When the power supply to the faulty phase of the second armature windings is stopped, the magnetic field generated in the angle detector 4 by the current flowing through the second inverter connection unit 5a2 is generated by the connection wires of the two non-faulty phases of the inverter connection unit 5a2, while the magnetic field generated in the angle detector 4 by the current flowing through the first inverter connection unit 5a1 is generated by the connection wires of the three phases of the inverter connection unit 5a1.

In other words, similar effects are obtained by implementing correction using the correction signals described in the first to seventh embodiments on the basis of the currents flowing through the connection wires of two phases of the second inverter connection unit 5a2 and three phases of the first inverter connection unit 5a1.

Here, the power supply to the faulty phase is simply stopped, but when a short circuit occurs in a switching element of the second inverter 2a2 or the like such that a current is passed through the switching element forcibly, similar effects can be obtained by employing a correction formula that takes this into account.

Further, here, the correction signals are represented by formulae using simple sine waves, but in the case of a waveform that cannot easily be expressed by a formula, a table corresponding to the electrical angle may be prepared in advance and installed.

According to the eighth embodiment, as described above, a plurality of inverter connection units are disposed so that the noise magnetic fields formed by the multi-phase alternating currents flowing through the inverter connection units cancel each other out in the position of the angle detector. Hence, when a fault occurs in an inverter connection unit, only the noise magnetic field that is no longer canceled out due to the fault need be corrected, and as a result, errors in the sine signal and the cosine signal due to the noise magnetic field can be corrected by a simple calculation.

Note that here, an arrangement in which the phases of the currents flowing through the first armature windings and the second armature windings are identical such that the magnetic fields generated by the inverter connection units 5a1 and 5a2 cancel each other out completely was described, but needless to mention, even with an arrangement in which the magnetic fields do not completely cancel each other out due to structural limitations, relationships to other components, and so on, similar effects are obtained by employing an appropriate correction formula for the arrangement.

Further, with an arrangement in which the magnetic fields do not completely cancel each other out during a normal operation such that the angle error caused by the noise magnetic field is too large to be ignored, the angle error may of course be corrected using the correction signals described in the first to seventh embodiments even during a normal operation. In this case, the noise magnetic fields generated during a normal operation are different to the noise magnetic fields generated when a fault occurs, and therefore the correction formula should be modified.

Furthermore, a case in which the magnetic fields generated by the inverter connection units 5a1 and 5a2 cancel each other out during a normal operation when no phase difference exists was described above, but even when a phase difference exists, similar effects can be obtained by appropriately adopting a different arrangement to that of the eighth embodiment with which the magnetic fields cancel each other out.

Moreover, the control device for an AC rotary machine according to this invention may be provided in an electric power steering such that the AC rotary machine 1a generates torque for assisting steering torque generated by a steering system. In so doing, it is possible to construct a steering system in which a torque ripple generated due to an angle error remains small even when a fault occurs in a phase of the vibration-sensitive electric power steering.

The invention claimed is:

1. A control device for an AC rotary machine, which controls an AC rotary machine in which a rotor is rotated by a rotating magnetic field formed by a multi-phase alternating current flowing through an armature winding of a stator, the control device comprising:
   an inverter that applies a voltage to the armature winding of the AC rotary machine;
   an inverter connection unit that connects the armature winding to the inverter;
   a magnetic field generator that generates an angle detecting magnetic field for detecting a rotation angle of the AC rotary machine by rotating in synchronization with the rotor;
   an angle detector that detects two mutually orthogonal components of the angle detecting magnetic field generated by the magnetic field generator as a sine signal and a cosine signal; and
   a control calculation unit that controls the voltage applied by the inverter on the basis of a current command of the AC rotary machine and angle information obtained from the sine signal and the cosine signal,
   wherein the control calculation unit includes an angle correction calculation unit that corrects an error in the angle information caused by a noise magnetic field generated by a multi-phase alternating current flowing through the inverter connection unit by using a correction signal having a phase and an amplitude that are determined in accordance with a current vector of the multi-phase alternating current flowing through the inverter connection unit and a phase correction constant and an amplitude correction constant determined from a relative positional relationship between the inverter connection unit and the angle detector, and outputs the corrected error as a corrected electrical angle, and the control calculation unit controls the inverter on the basis of the corrected electrical angle.

2. The control device for an AC rotary machine according to claim 1, wherein
   the angle information is either an electrical angle or a multiple of the electrical angle, and
   the angle correction calculation unit calculates at least one of a sine signal correction signal and a cosine signal correction signal as the correction signal,
   calculates a difference between the sine signal and the sine signal correction signal as a corrected sine signal,
   calculates a difference between the cosine signal and the cosine signal correction signal as a corrected cosine signal, and
   outputs a corrected electrical angle obtained from the corrected sine signal and the corrected cosine signal as the corrected electrical angle.

3. The control device for an AC rotary machine according to claim 1, wherein
   the angle information is either a detection angle of the angle detector or a constant multiple of the detection angle, and
   when the number of pole pairs of the AC rotary machine is P and a shaft angle multiplier of the angle detector is Psns,
   the angle correction calculation unit calculates at least one of a sine signal correction signal and a cosine signal correction signal as the correction signal,
   calculates a difference between the sine signal and the sine signal correction signal as a corrected sine signal,
   calculates a difference between the cosine signal and the cosine signal correction signal as a corrected cosine signal, and outputs a corrected electrical angle calculated from a value obtained by multiplying a corrected detection angle, which is obtained from the corrected sine signal and the corrected cosine signal, by the value Kp, where Kp=P/Psns.

4. The control device for an AC rotary machine according to claim 2, wherein
when, among the sine signal and the cosine signal, a signal in which the error caused by the noise magnetic field is larger is set as a first signal and a signal in which the error caused by the noise magnetic field is smaller is set as a second signal,
the angle correction calculation unit calculates a first signal correction signal as the correction signal for the first signal
calculates a difference between the first signal and the first signal correction signal as a corrected first signal, and
outputs a corrected electrical angle obtained from the corrected first signal and the second signal as the corrected electrical angle.

5. The control device for an AC rotary machine according to claim 2, wherein
the correction signal is a sine wave, and
has an amplitude value obtained by multiplying an absolute value of the current vector by the amplitude correction constant and has
a phase value obtained by adding a first order phase, which serves as a fundamental period of the electrical angle or the corrected electrical angle, and the phase correction constant to a phase angle relative to a q axis of the current vector.

6. The control device for an AC rotary machine according to claim 5, wherein
the angle detector is used in a saturation sensitivity region, and
when the number of pole pairs of the AC rotary machine is set as P and a shaft angle multiplier of the angle detector is set as Psns,
the correction signal is a sine wave, and has
an amplitude value obtained by multiplying the absolute value of the current vector by the amplitude correction constant and has
a phase value obtained by adding a $(1 \pm 2Psns/P)^{th}$ order phase of the electrical angle or the corrected electrical angle and the phase correction constant to the phase angle relative to the q axis of the current vector.

7. The control device for an AC rotary machine according to claim 5, wherein
the correction signal further includes a term relating to an $n^{th}$ order sine wave, where n is a natural number not smaller than 2, and
the $n^{th}$ order sine wave has an amplitude value obtained by multiplying the absolute value of the current vector by the amplitude correction constant and has
a phase value obtained by adding an $n^{th}$ order phase of the electrical angle or the corrected electrical angle and the phase correction constant to the phase angle relative to the q axis of the current vector.

8. The control device for an AC rotary machine according to claim 7, wherein
the angle detector is used in a saturation sensitivity region, the correction signal further includes a term relating to an $(n \pm 2Psns/P)^{th}$ order sine wave, where n is a natural number not smaller than 2, and
the $(n \pm 2Psns/P)^{th}$ order sine wave has an amplitude value obtained by multiplying the absolute value of the current vector by the amplitude correction constant and has
a phase value obtained by adding an $(n \pm 2Psns/P)^{th}$ order phase of the electrical angle or the corrected electrical angle and the phase correction constant to the phase angle relative to the q axis of the current vector.

9. The control device for an AC rotary machine according to claim 1, wherein
the angle information is either an electrical angle or a multiple of the electrical angle, and
the angle correction calculation unit calculates an electrical angle correction signal as the correction signal for the electrical angle, and
outputs a difference between the electrical angle and the electrical angle correction signal as the corrected electrical angle.

10. The control device for an AC rotary machine according to claim 1, wherein
the angle information is either a detection angle of the angle detector or a multiple of the detection angle, and
when the number of pole pairs of the AC rotary machine is P and a shaft angle multiplier of the angle detector is Psns,
the angle correction calculation unit calculates a detection angle correction signal as the correction signal for the detection angle, and
outputs a corrected electrical angle calculated from a value obtained by multiplying a difference between the detection angle and the detection angle correction signal, which is obtained from the sine signal and the cosine signal, by the value Kp, where Kp=P/Psns.

11. The control device for an AC rotary machine according to claim 9, wherein
when the number of pole pairs of the AC rotary machine is P and a shaft angle multiplier of the angle detector is Psns,
the correction signal is a sine wave, and has
an amplitude value obtained by multiplying the amplitude correction constant by an absolute value of the current vector and has
a phase value obtained by adding a $(1 \pm 2Psns/P)^{th}$ order phase of the electrical angle or the corrected electrical angle and the phase correction constant to a phase angle relative to a q axis of the current vector.

12. The control device for an AC rotary machine according to claim 11, wherein
the correction signal further includes a term relating to an $(n \pm 2Psns/P)^{th}$ order sine wave, where n is a natural number not smaller than 2, and
the $(n \pm 2Psns/P)^{th}$ order sine wave has an amplitude value obtained by multiplying the amplitude correction constant by the absolute value of the current vector and has
a phase value obtained by adding an $(n \pm 2Psns/P)^{th}$ order phase of the electrical angle or the corrected electrical angle and the phase correction constant to the phase angle relative to the q axis of the current vector.

13. The control device for an AC rotary machine according to claim 1, wherein
the armature winding is constituted by a first armature winding and a second armature winding,
the inverter is constituted by a first inverter that applies a voltage to the first armature winding and a second inverter that applies a voltage to the second armature winding,
the inverter connection unit is constituted by a first inverter connection unit that connects the first armature winding to the first inverter and a second inverter connection unit that connects the second armature winding to the second inverter, and when a fault occurs in at least one of the second armature winding, the second inverter, and the second inverter connection unit, the angle correction calculation unit calculates the correction signal after replacing the phase correction constant and the amplitude correction constant with a phase correction constant and an amplitude correction constant for use during a fault.

14. The control device for an AC rotary machine according to claim 1, wherein the armature winding is constituted by a first armature winding and a second armature winding, the inverter is constituted by a first inverter that applies a voltage to the first armature winding and a second inverter that applies a voltage to the second armature winding, the inverter connection unit is constituted by a first inverter connection unit that connects the first armature winding to the first inverter and a second inverter connection unit that connects the second armature winding to the second inverter, the first inverter connection unit and the second inverter connection unit are disposed such that the noise magnetic field is canceled out in a position of the angle detector, and when a fault occurs in at least one of the second armature winding, the second inverter, and the second inverter connection unit such that the noise magnetic field is not completely canceled out due to the fault, the angle correction calculation unit corrects the error in the electrical angle caused by the noise magnetic field.

15. The control device for an AC rotary machine according to claim 1, wherein the angle correction calculation unit uses a previously calculated value of the corrected angle information, calculated by the angle correction calculation unit, as the angle information.

16. The control device for an AC rotary machine according to claim 15, wherein the angle correction calculation unit corrects the previously calculated value of the corrected angle information by adding thereto a product of a time from a previous calculation to a current calculation and a temporal variation rate of the angle information.

17. The control device for an AC rotary machine according to claim 1, wherein the control calculation unit obtains the current vector from the current command.

18. The control device for an AC rotary machine according to claim 1, further comprising a current detector that detects the multi-phase alternating current, wherein the control calculation unit obtains the current vector from a detected current detected by the current detector.

19. The control device for an AC rotary machine according to claim 1, wherein the amplitude correction constant is commensurate with respective fundamental wave amplitudes of the sine signal and the cosine signal output by the angle detector.

20. The control device for an AC rotary machine according to claim 1, which is used to assist steering torque generated by an electric power steering.

* * * * *